US011589222B2

(12) United States Patent
Hwang et al.

(10) Patent No.: US 11,589,222 B2
(45) Date of Patent: Feb. 21, 2023

(54) ELECTRONIC APPARATUS, USER TERMINAL, AND METHOD FOR CONTROLLING THE ELECTRONIC APPARATUS AND THE USER TERMINAL

(71) Applicant: SAMSUNG ELECTRONICS CO., LTD., Suwon-si (KR)

(72) Inventors: Sungjun Hwang, Suwon-si (KR); Jiyeon Ma, Suwon-si (KR); Donghun Shin, Suwon-si (KR); Euijun Kim, Suwon-si (KR); Youngah Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 402 days.

(21) Appl. No.: 16/828,027

(22) Filed: Mar. 24, 2020

(65) Prior Publication Data

US 2020/0359217 A1 Nov. 12, 2020

(30) Foreign Application Priority Data

May 8, 2019 (KR) ........................ 10-2019-0053500

(51) Int. Cl.
*H04W 12/06* (2021.01)
*G06T 7/73* (2017.01)
(Continued)

(52) U.S. Cl.
CPC .............. *H04W 12/06* (2013.01); *G06T 7/73* (2017.01); *H04M 1/72412* (2021.01);
(Continued)

(58) Field of Classification Search
None
See application file for complete search history.

(56) References Cited

U.S. PATENT DOCUMENTS 8,610,730 B1 12/2013 Li et al.
9,547,419 B2 1/2017 Yang et al.
(Continued)

FOREIGN PATENT DOCUMENTS

| JP | 6107935 B2 | 4/2017 |
| KR | 10-2012-0123941 A | 11/2012 |
| WO | 2014/032088 A1 | 3/2014 |

OTHER PUBLICATIONS

Communication dated May 13, 2020 issued by the European Intellectual Property Office in counterpart European Application No. 20163319.5.

(Continued)

*Primary Examiner* — Clemence S Han
(74) *Attorney, Agent, or Firm* — Sughrue Mion, PLLC

(57) ABSTRACT

An electronic apparatus includes a display, a communication interface, a memory comprising at least one instruction, and a processor configured to execute the at least one instruction, and the processor, by executing the at least one instruction, is configured to, based on an external user terminal being discovered through the communication interface, control the display to display a marker including at least one of a text or an image for guiding an operation of a user to establish a communication connection with the external user terminal, based on authentication on the electronic apparatus being performed by capturing the electronic apparatus outputting the marker by the external user terminal, receive a signal confirming authentication on the electronic apparatus from the external user terminal, and establish a communication connection with the external user terminal in response to the signal.

14 Claims, 34 Drawing Sheets

(51) Int. Cl.
  *H04W 76/14* (2018.01)
  *H04W 8/00* (2009.01)
  *H04M 1/72412* (2021.01)
  *H04M 1/72469* (2021.01)
  *H04W 12/50* (2021.01)

(52) U.S. Cl.
  CPC ....... *H04M 1/72469* (2021.01); *H04W 8/005* (2013.01); *H04W 12/50* (2021.01); *H04W 76/14* (2018.02); *G06T 2207/30204* (2013.01)

(56) References Cited

U.S. PATENT DOCUMENTS

| | | | |
|---|---|---|---|
| 10,044,692 B2 | 8/2018 | Kunihiro et al. | |
| 2008/0039063 A1 | 2/2008 | Ichieda | |
| 2011/0246909 A1 | 10/2011 | Berrett et al. | |
| 2012/0161968 A1* | 6/2012 | Bodapati | G08B 13/2485 340/572.1 |
| 2012/0198572 A1 | 8/2012 | Beals et al. | |
| 2013/0198518 A1* | 8/2013 | Ran | H04L 63/08 713/170 |
| 2015/0163302 A1* | 6/2015 | Armstrong | H04L 67/1097 709/217 |
| 2015/0163549 A1 | 6/2015 | Suh et al. | |
| 2016/0269394 A1 | 9/2016 | Zhong | |
| 2016/0285839 A1 | 9/2016 | Kunihiro et al. | |
| 2016/0330628 A1 | 11/2016 | Kakutani | |
| 2016/0337951 A1 | 11/2016 | Ding et al. | |
| 2017/0004475 A1* | 1/2017 | White | G06Q 20/3567 |
| 2018/0150626 A1* | 5/2018 | Maresh | H04L 63/102 |
| 2019/0012117 A1 | 1/2019 | Zhao et al. | |

OTHER PUBLICATIONS

International Search Report dated Jul. 9, 2020 issued by the International Searching Authority in counterpart International Application No. PCT/KR2020/004772 (PCT/ISA/210).

International Written Opinion dated Jul. 9, 2020 issued by the International Searching Authority in counterpart International Application No. PCT/KR2020/004772 (PCT/ISA/237).

Communication dated Dec. 14, 2021 by the European Patent Office for European Patent Application No. 20163319.5.

Communication dated Dec. 19, 2022 issued by Intellectual Property India in counterpart Indian Patent Application No. 202024019026.

\* cited by examiner

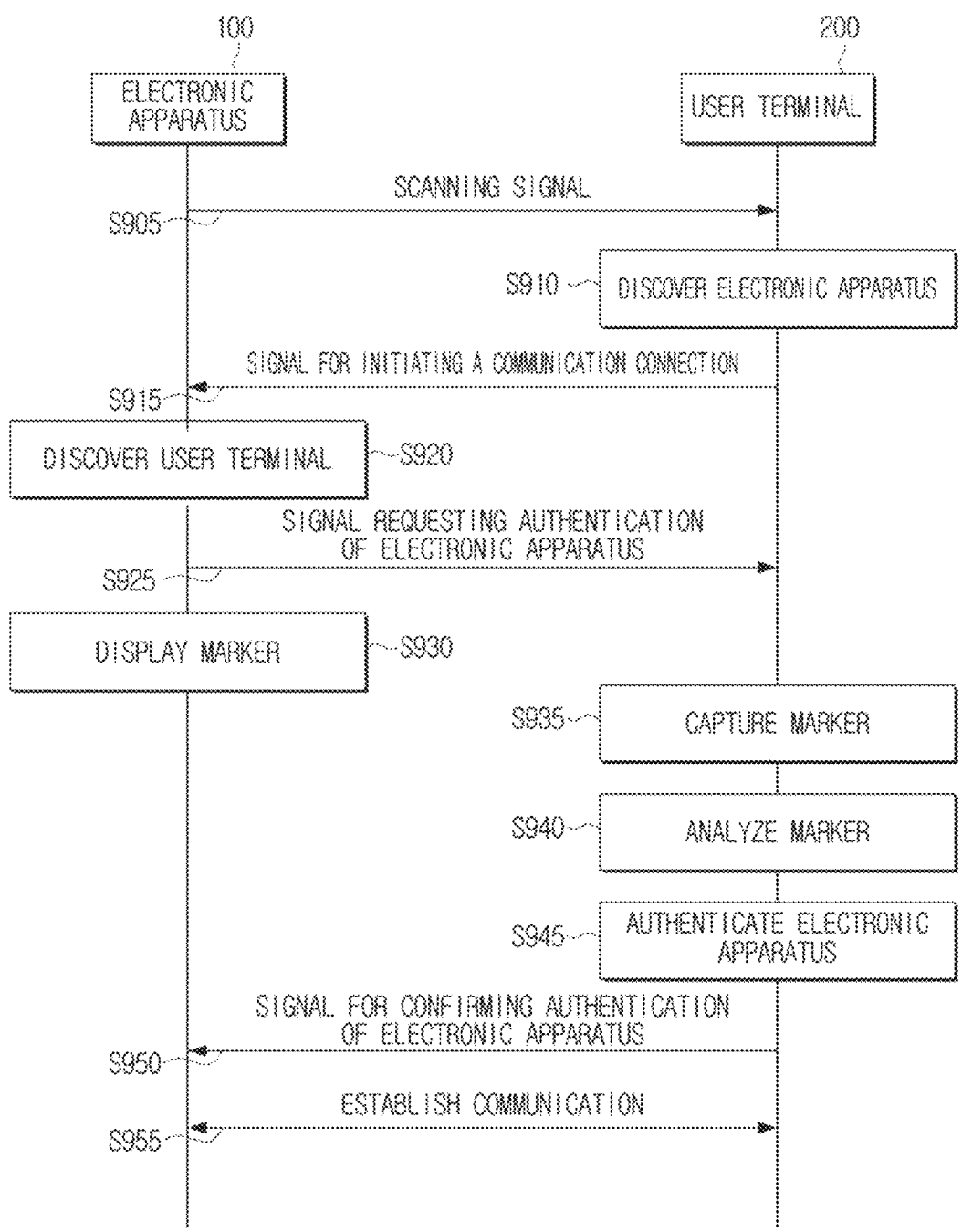

ELECTRONIC APPARATUS, USER TERMINAL, AND METHOD FOR CONTROLLING THE ELECTRONIC APPARATUS AND THE USER TERMINAL

CROSS-REFERENCE TO RELATED APPLICATION(S)

This application is based on and claims priority under 35 U.S.C. § 119 to Korean Patent Application No. 10-2019-0053500, filed on May 8, 2019, in the Korean Intellectual Property Office, the disclosure of which is incorporated by reference herein in its entirety.

BACKGROUND

1. Field

The disclosure relates to an electronic apparatus, a user terminal, and a method for controlling thereof. More particularly, the disclosure relates to an electronic apparatus capable of establishing a communication connection between a user terminal and an electronic apparatus by the user terminal capturing a marker that is output by the electronic apparatus, and a corresponding user terminal and a corresponding method for controlling thereof.

2. Description of Related Art

Recently, a variety of services are provided by establishing a communication connection between an electronic apparatus, such as a television (TV), and a user terminal, such as a smart phone. In particular, when establishing a communication connection between an electronic apparatus and a user terminal, whether the electronic apparatus and the user terminal are in a same space may be necessary to be determined for establishing a secure connection.

Conventionally, a communication connection may be established between an electronic apparatus and a user terminal by using an ultrasonic wave or a pin code. Specifically, a communication connection may be established between an electronic apparatus and a user terminal by the electronic apparatus generating an ultrasonic wave and the user terminal detecting an ultrasonic wave, or by the electronic apparatus outputting a pin code and the user terminal receiving the pin code.

However, conventional approaches might not be intuitive to a user or require additional user input. Thus, a more intuitive and simple way of establishing a communication connection between an electronic apparatus and a user terminal is desirable.

SUMMARY

Provided are an electronic apparatus capable of more intuitively and simply establishing a communication connection between a user terminal and an electronic apparatus by a user terminal capturing a marker including at least one of a text or an image for guiding a user's operation output by the electronic apparatus, and a corresponding user terminal and a corresponding method of controlling thereof.

According to an aspect of an embodiment, there is provided an electronic apparatus including a display, a communication interface comprising a circuitry, a memory comprising at least one instruction, and a processor configured to execute the at least one instruction, and the processor, by executing the at least one instruction, is configured to, based on an external user terminal being discovered by the electronic apparatus through the communication interface, control the display to display a marker for guiding an operation of a user to establish a communication connection between the electronic apparatus and the external user terminal, based on the external user terminal authenticating the electronic apparatus by capturing an image of the electronic apparatus displaying the marker, receive a signal confirming authentication of the electronic apparatus from the external user terminal through the communication interface, and establish a communication connection with the external user terminal through the communication interface in response to receiving the signal.

The processor is configured to control the display to display a background screen of a predefined pattern or a color along with the marker.

The processor is configured to receive information on the external user terminal through the communication interface, and based on the communication connection with the external user terminal being established, remove the marker and control the display to display the information on the external user terminal.

The electronic apparatus further includes a light outputter, and the processor is configured to control the light outputter to output light of a predefined pattern as the marker.

According to an aspect of an embodiment, there is provided a user terminal including a camera, a display, a communication interface, a memory comprising at least one instruction, and a processor configured to execute the at least one instruction, and the processor, by executing the at least one instruction, is configured to, based on an electronic apparatus being discovered by the user terminal through the communication interface, control the display to display a menu for establishing a communication connection with the electronic apparatus, based on receiving a user input for establishing the communication connection with the electronic apparatus through the menu, activate the camera and control the display to display a screen comprising an image captured by the camera, and based on the electronic apparatus being authenticated by analyzing a marker included in the image for guiding an operation of a user to establish the communication connection with the user terminal, establish the communication connection with the electronic apparatus by transmitting a signal confirming authentication of the electronic apparatus through the communication interface.

The processor is configured to analyze at least one of a text or an image included in the maker and authenticate the electronic apparatus based on the analyzed at least one of the text or the image corresponding to at least one of a pre-stored text or a pre-stored image.

The processor is configured to authenticate the electronic apparatus by analyzing an appearance of an electronic apparatus included in the captured image along with a text and an image included in the marker and a background screen output by the electronic apparatus.

The screen may include a user interface (UI) for guiding a position of the electronic apparatus that outputs the marker.

The processor is configured to receive information on the electronic apparatus through the communication interface while discovering the electronic apparatus, and the screen may include information on the electronic apparatus along with the image.

The processor is configured to, based on a communication connection with the electronic apparatus being established, remove the image and control the display to display a message indicating that a communication connection with the electronic apparatus is completed.

According to an aspect of an embodiment, there is provided a method of controlling an electronic apparatus including, based on an external user terminal being discovered by the electronic apparatus, displaying a marker for guiding an operation of a user to establish a communication connection with the external user terminal, based on the external user terminal authenticating the electronic apparatus by capturing an image of the electronic apparatus displaying the marker, receiving a signal confirming authentication of the electronic apparatus from the external user terminal, and establishing a communication connection with the external user terminal in response to receiving the signal.

The displaying the marker may include displaying a background screen of a predefined pattern or a color along with the marker.

The method may include receiving information on the external user terminal; and based on the communication connection with the external user terminal being established, removing the marker and displaying information on the external user terminal.

The method may include outputting light of a predefined pattern as the marker.

According to an aspect of an embodiment, there is provided a method of controlling a user terminal including, based on an electronic apparatus being discovered by the user terminal, displaying a menu for establishing a communication connection with the electronic apparatus; based on receiving a user input for establishing the communication with the electronic apparatus through the menu, activating a camera of the user terminal and displaying a screen comprising an image captured by the camera; and based on the electronic apparatus being authenticated by analyzing a marker included in the image for guiding an operation of a user to establish the communication connection with the user terminal, establishing the communication connection with the electronic apparatus by transmitting a signal confirming authentication of the electronic apparatus.

The method may include analyzing at least one of a text or an image included in the marker and authenticating the electronic apparatus based on and the analyzed at least one of the text and the image corresponding to at least one of a pre-stored text or a pre-stored image.

The authenticating may include authenticating the electronic apparatus by analyzing a format of an electronic apparatus included in the captured image along with a text and an image included in the marker and a background screen output by the electronic apparatus.

The screen may include a user interface (UI) for guiding a position of the electronic apparatus that outputs the marker.

The method may include receiving information on the electronic apparatus while discovering the electronic apparatus, and the screen may include information on the electronic apparatus along with the image.

The method may include, based on a communication connection with the electronic apparatus being established, removing the image and displaying a message indicating that a communication connection with the electronic apparatus is completed.

By the diverse embodiments as described above, a user terminal may establish a communication connection between an electronic apparatus and a user terminal more intuitively and simply, by capturing by a user terminal a marker including at least one of a text or an image for guiding a user's operation output by the electronic apparatus.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9A is a sequence diagram illustrating a process for establishing a communication connection using a Bluetooth module, according to an embodiment;

DETAILED DESCRIPTION

Figure 1:
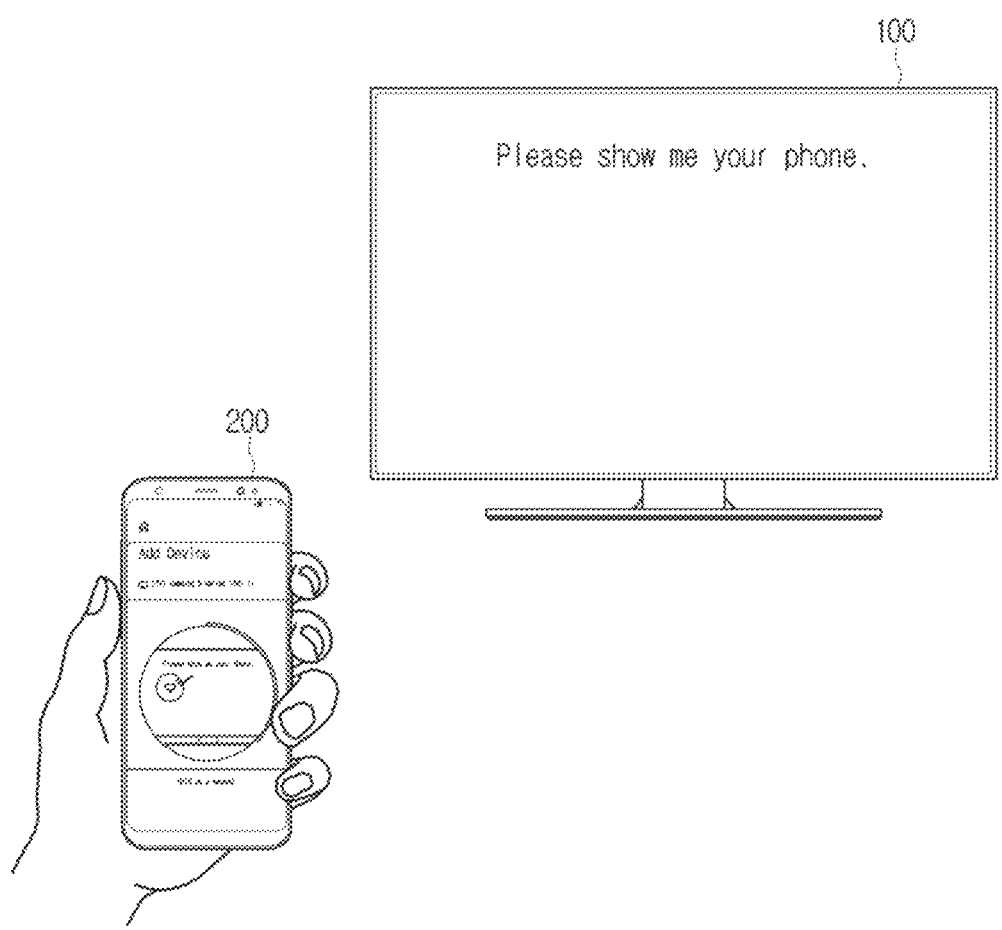
FIG. 1 is a view illustrating a method of establishing a communication connection between an electronic apparatus and a user terminal, according to an embodiment.

Various embodiments will be disclosed. However, it may be understood that the disclosure is not limited to the embodiments described hereinafter, but includes various modifications, equivalents, and/or alternatives of the embodiments of the disclosure.

In this specification, the expressions "have," "may have," "include," or "may include" or the like represent presence of a corresponding feature (for example: components such as numbers, functions, operations, or parts) and such expressions do not exclude the presence of additional features or elements.

In this document, the expressions "A or B," "at least one of A and/or B," or "one or more of A and/or B," and the like include all possible combinations of the listed items. For example, "A or B," "at least one of A and B," or "at least one of A or B" includes (1) at least one A, (2) at least one B, (3) at least one A and at least one B.

As used herein, the terms "first," "second," or the like may denote various components, regardless of order or importance, and may be used to distinguish one component from another, and do not limit the components. For example, a first user appliance and a second user appliance may indicate different user appliances regardless of their order or importance. For example, without departing from the scope as described herein, a first element may be referred to as a second element, or similarly, a second element may be referred to as a first element.

The term such as "module," "unit," "part," and so on is used to refer to an element that performs at least one function or operation, and such element may be implemented as hardware or software, or a combination of hardware and software. Further, except for when each of a plurality of "modules," "units," "parts," and the like may be realized in an individual hardware, the components may be integrated in at least one module or chip and be realized in at least one processor. For example, a module may be composed of an application-specific integrated circuit (ASIC).

It is to be understood that an element (e.g., a first element) is "operatively or communicatively coupled with/to" another element (e.g., a second element) is that any such element may be directly connected to the other element or may be connected via another intervening element (e.g., a third element). On the other hand, when it is mentioned that an element (e.g., a first element) is "directly connected" or "directly accessed" to another element (e.g., a second element), it can be understood that there is no other intervening element (e.g., a third element) between the elements.

Also, the expression "configured to" used in the disclosure may be interchangeably used with other expressions such as "suitable for," "having the capacity to," "designed to," "adapted to," "made to," and "capable of," depending on context. Instead, under some circumstances, the expression "a device configured to" may mean that the device "is capable of" establishing an operation together with another device or component. For example, the phrase "a processor configured to establish A, B, and C" may mean a dedicated processor (e.g.: an embedded processor) for performing the corresponding operations, or a generic-purpose processor (e.g.: a CPU or an application processor) that can establish the corresponding operations by executing one or more software programs stored in a memory device.

The terms used in the description are used to describe one or more embodiments, but may not intend to limit the scope of other embodiments. Unless otherwise defined specifically, a singular expression may encompass a plural expression. All terms (including technical and scientific terms) used in the description could be used as meanings commonly understood by those ordinary skilled in the art to which the disclosure belongs. The terms that are used in the disclosure and are defined in a general dictionary may be used as meanings that are identical or similar to the meanings of the terms from the context of the related art, and they are not interpreted ideally or excessively unless they have been clearly and specially defined. According to circumstances, even the terms defined in the embodiments of the disclosure may not be interpreted as excluding the embodiments of the disclosure.

The disclosure will be described in greater detail below with reference to the accompanying drawings to enable those skilled in the art to implement the concepts of disclosure with ease. However, the disclosure may be implemented as several different forms and not to be limited to any of specific examples described herein. Further, in order to clearly describe the disclosure in the drawings, portions irrelevant to the description may be omitted, and throughout the description, the like elements are given the similar reference numerals.

FIG. 1 is a view illustrating a method of establishing a communication connection between an electronic apparatus and a user terminal, according to an embodiment. An electronic apparatus 100 according to an embodiment may be implemented as a TV, as illustrated in FIG. 1, but this is merely exemplary. The electronic apparatus 100 may be implemented as a home gateway device or a home appliance product (for example, a digital video disc (DVD) player, an audio, a refrigerator, an air-conditioner, a cleaner, an oven, a microwave, a washing machine, an air purifier, a robot cleaner, a set-top box, a home automation control panel, a door lock, a security control panel, a TV box (e.g., Samsung HomeSync™, Apple TV™, or Google TV™), a game console (e.g., Xbox™, Play Station™), an electronic dictionary, an electronic key, a camcorder, an electronic frame), or the like. A user terminal 200, as illustrated in FIG. 1, may be implemented as a smartphone, but this is merely exemplary. The user terminal 200 may be implemented as a tablet personal computer (PC), a mobile phone, a video phone, an artificial intelligence (AI) speaker, a speaker (a speaker including at least one microphone and a network module (AI function is not provided)), an e-book reader, a laptop PC, a netbook computer, a personal digital assistant (PDA), a portable multimedia player (PMP), an MP3 player, a mobile medical device, a camera, or a wearable device.

When a user input to establish a communication connection is received, the electronic apparatus 100 may discover the user terminal 200 or another electronic apparatus around the electronic apparatus 100. Specifically, the electronic apparatus 100 may transmit (or broadcast) a scanning signal to discover the user terminal 200 or another electronic apparatus. The communication connection may be the first communication connection (or pairing) between the electronic apparatus 100 and the user terminal 200 to register the electronic apparatus 100 to the user terminal 200, but this is only one embodiment. The communication connection may be a communication connection between a general electronic apparatus and the user terminal 200.

The user terminal 200 may discover the electronic apparatus 100 in response to a scanning signal transmitted by the electronic apparatus 100. That is, when the user terminal 200 discovers the electronic apparatus 100 by receiving the scanning signal transmitted by the electronic apparatus 100, the user terminal 200 may display a menu for confirming a communication connection with the electronic apparatus 100. Specifically, the user terminal 200 may execute an application for a communication connection and display a menu provided by an application for communication connection in a pop-up form.

When the user input for a communication connection is received through a menu, the user terminal 200 may transmit a response signal for initiating the communication connection to the electronic apparatus 100. The electronic apparatus 100 may discover the user terminal 200 based on the response signal. When the user terminal 200 is discovered, the electronic apparatus 100 may transmit a signal for authenticating the electronic apparatus 100 to the user terminal 200.

The electronic apparatus 100 may display thereon a marker or other graphical element that includes at least one of a text or an image that guide a user's operation to establish a communication connection with the user terminal 200. For example, the electronic apparatus 100 may display a marker that includes at least one of a text or an image that guides the user's operation, such as "Please show me your phone" or the like. According to another embodiment, the electronic apparatus 100 may provide a marker by light output with a predetermined pattern using a light output device (e.g., a light emitting diode (LED), or the like) and may provide a marker with a background screen that includes predefined colors or patterns in addition to a text and an image.

The user terminal 200 may activate a camera in response to user input entered via the menu and display a screen (the screen of the already executed application) including the image captured by the activated camera. At this time, the user terminal 200 may display an image including the electronic apparatus 100 outputting the marker. The user terminal 200 may also display a guide user interface (UI) for guiding a position of the electronic apparatus 100 outputting a marker in the screen for more accurate authentication.

When the electronic apparatus 100 is authenticated through detection of the predefined marker included in the image, the user terminal 200 may transmit a signal confirming the authentication of the electronic apparatus 100 to establish a communication connection with the electronic apparatus 100. Specifically, the user terminal 200 may analyze at least one of the text and the image included in the marker in the captured image to determine whether the analyzed text or image corresponds to at least one of the pre-stored text or the image. That is, the electronic apparatus 100 may output a predefined marker, and the user terminal 200 may store information identifying the marker for authentication to the electronic apparatus 100 when an application for a communication connection with the electronic apparatus 100 is installed.

If the text and the image included in the marker in the captured image correspond to at least one of pre-stored text or image, the user terminal 200 may authenticate the electronic apparatus 100 and transmit, to the electronic apparatus 100, a signal to confirm authentication for the electronic apparatus 100. At this time, the user terminal 200 may authenticate the electronic apparatus 100 using at least one of the text or the image included in the marker outputted by the electronic apparatus 100, but this is merely exemplary. Additionally, the user terminal 200 can authenticate the electronic apparatus 100 by analyzing a type of the electronic apparatus 100 included in the captured image and a background screen output by the electronic apparatus 100 along with the text and the image included in the marker, to enhance security.

The electronic apparatus 100 may establish communication connection with the user terminal 200 by receiving a signal confirming authentication of the electronic apparatus 100.

The electronic apparatus 100 may output the sound feedback together with a marker that guides the user's operation while outputting the marker. Specifically, because the marker output by the electronic apparatus 100 is output in a form that is difficult for a user to recognize, feedback to guide a user's operation is necessary. Thus, the electronic apparatus 100 may guide the user's operation by outputting the sound feedback together with the marker. At this time, the sound feedback is reproduced as a source code rather than an existing recorded music file, and thus, a natural sound experience may be provided depending on the user environment and the situation.

The user terminal 200 may establish a communication connection with the electronic apparatus 100 using a predefined marker, but this is only exemplary. The user terminal 200 may provide various services by capturing the electronic apparatus 100 while a marker including a predefined pattern is being output by the electronic apparatus 100. This will be described later with reference to FIGS. 14A to 17E.

Figure 2:
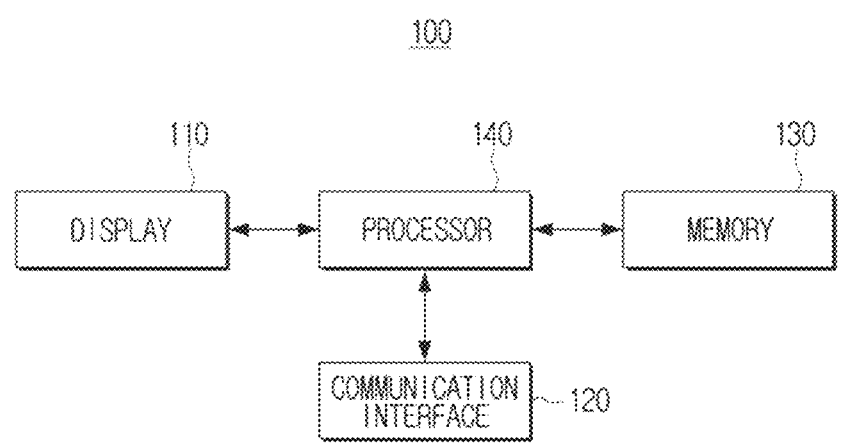
FIG. 2 is a block diagram illustrating a configuration of an electronic apparatus, according to an embodiment.

FIG. 2 is a block diagram illustrating a configuration of an electronic apparatus, according to an embodiment. As illustrated in FIG. 2, the electronic apparatus 100 may include a display 110, a communication interface 120, a memory 130, and a processor 140. The configuration is not limited thereto and some components of the electronic apparatus 100 may be added or omitted according to a type of the electronic apparatus 100.

The display 110 may display an image received from an external image source (for example, a broadcasting station, a set-top box, or the like). The display 110 may display a marker for establishing communication connection with the external user terminal 200, in addition to an image received from the image source. The marker may include at least one of a text and an image for guiding a user's operation for communication connection of the user terminal 200 and the electronic apparatus 100.

The display 110 may be implemented as any of various types of a display such as a liquid crystal display (LCD), an organic light emitting diode (OLED) display, a plasma display panel (PDP), or the like. The display 110 may include a driving circuit and a backlight unit, which may be implemented in the form of an a-si TFT, a low temperature poly silicon (LTPS) TFT, an organic TFT (OTFT). The display 110 may be implemented as a touch screen coupled with a touch sensor, a flexible display, a third-dimensional display (3D display), or the like.

The communication interface 120 is configured to communicate with various types of external devices according to various types of communication methods. The communication interface 120 may include various communication modules and establish communication connection with an external user terminal according to a communication protocol corresponding to a type of a communication module. For example, the communication interface 120 may include a Wi-Fi module or a Bluetooth module. A method of establishing communication connection with the external user terminal 200 using the Wi-Fi module or Bluetooth module will be described later with reference to FIGS. 9A and 9B.

The communication interface 120 may transmit (or broadcast) a scanning signal, receive a signal to initiate communication connection to the external user terminal 200 in response to a scanning signal, and receive a signal requesting authentication of the electronic apparatus 100. The communication interface 120 may receive a signal for confirming authentication for the electronic apparatus 100 from the external user terminal 200, and may establish a communication connection with the user terminal 200 in response to a signal confirming authentication for the electronic apparatus 100.

The memory 130 may store data and applications for providing functionality related to operations of the electronic apparatus 100. The memory 130 may be implemented as a memory embedded with the electronic apparatus 100, or may be implemented as a detachable, removable, or modular memory in the electronic apparatus 100, according to the data usage purpose and the configuration of the electronic apparatus 100. For example, data for driving the electronic apparatus 100 may be stored in a memory embedded in the electronic apparatus 100, and data for an expanded function of the electronic apparatus 100 may be stored in the memory detachable from the electronic apparatus 100. A memory embedded in the electronic apparatus 100 may be a volatile memory such as a dynamic random access memory (DRAM), a static random access memory (SRAM), a synchronous dynamic random access memory (SDRAM), or a nonvolatile memory (for example, one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive or a solid state drive (SSD). In the configuration of a memory detachably mounted to the electronic apparatus 100, the memory may be implemented as a memory card (for example, a compact flash (CF), secure digital (SD), micro secure digital (micro-SD), mini secure digital (mini-SD), extreme digital (xD), multi-media card (MMC), etc.), an external memory (for example, a USB memory) connectable to the USB port, or the like.

The memory 130 may store an application for establishing a communication connection with the user terminal 200, and may store a predetermined marker and a background screen for authenticating the electronic apparatus 100. The predefined marker may include at least one of a text or an image for guiding a user's operation for establishing a communication connection, and the background screen may have a predetermined pattern or color.

The processor 140 may be electrically connected to the memory 130 to control the overall operation and functionality of the electronic apparatus 100. In particular, upon discovery of the user terminal via the communication interface 120, the processor 140 may control the display 110 to display a marker that includes at least one of text and images that guide the user's operation to establish a communication connection with the user terminal 200. When the user terminal 200 captures an image of the electronic apparatus 100 outputting the marker and performs authentication with respect to the electronic apparatus 100, the processor 140 may receive a signal for confirming authentication of the electronic apparatus 100 from the user terminal 200 through the communication interface 120. Thereby, the electronic apparatus 100 may establish a communication connection with the user terminal 200 in response to the signal. At this time, the marker may already be pre-stored when an application for communication connection to the electronic apparatus 100 is installed.

For more intensified security, the processor 140 may control the display 110 to display a background screen of a predetermined pattern or color along with a marker including at least one of a text and an image.

The processor 140 may receive information on the user terminal 200 through the communication interface 120 while searching for the user terminal 200. When communication connection with the user terminal 200 is established, the processor 140 may delete the marker and control the display 110 to display information (for example, a user name of the user terminal, or the like) with respect to the user terminal.

Figure 3:
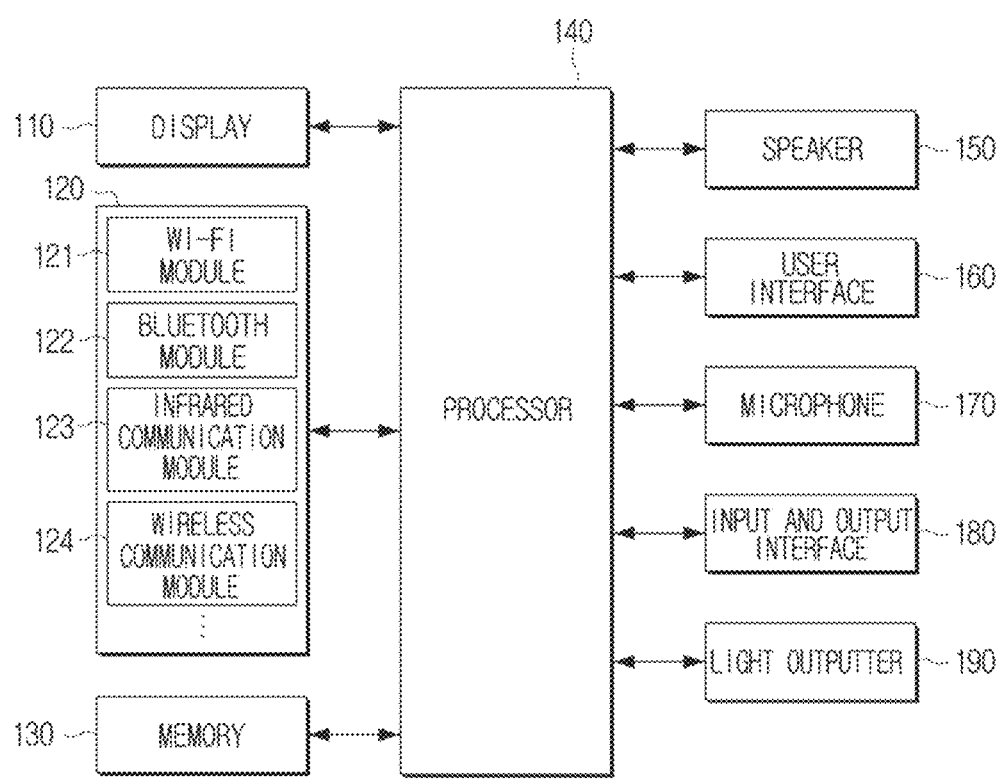
FIG. 3 is a block diagram illustrating a configuration of an electronic apparatus in detail, according to an embodiment.

FIG. 3 illustrates is a block diagram illustrating the configuration of an electronic apparatus, in accordance with one embodiment. As illustrated in FIG. 3, the electronic apparatus 100 may include the display 110, the communication interface 120, the memory 130, a speaker 150, a user interface 160, a microphone 170, an input/output interface 180, a light outputter 190, and the processor 140. Because the display 110, the communication interface 120, the memory 130, and the processor 140 have been described with reference to FIG. 2, a redundant description thereof will be omitted.

The communication interface 120 may communicate with other devices of various types. The communication interface 120 may include a Wi-Fi module 121, a Bluetooth module 122, an infrared communication module 123, a wireless communication module 124, and the like. The processor 140 may communicate with various devices via the communication interface 120. Here, the other devices may include a display device such as a TV, an image processing device such as a set-top box, an external server, a control device such as a remote control, an audio output device such as a Bluetooth speaker, a lighting device, a smart cleaner, a home appliance such as a smart refrigerator, a server such as an Internet of Things (IoT) home manager, a light, a blind, an IoT device such as a sensor, or the like.

The Wi-Fi module 121 and the Bluetooth module 122 establish communication using a Wi-Fi communication protocol and a Bluetooth communication protocol, respectively. When using the Wi-Fi module 141 or the Bluetooth module 122, various connection information such as a service set identifier (SSID) and a session key may be transmitted and received, and communication information may be transmitted after the communication connection is established. The infrared ray communication module 123 performs communication according to infrared data association (IrDA) technology that transmits data wireless to local area using infrared rays in wavelengths between visible rays and millimeter waves. The wireless communication module 124 may be a module establishing communication according to various communication standards such as Zigbee, $3^{rd}$ generation (3G), $3^{rd}$ generation partnership project (3GPP), long term evolution (LTE), LTE advanced (LTE-A), $4^{th}$ generation (4G), $5^{th}$ generation (5G), or the like, in addition to the communication methods described above. The communication interface 120 may include at least one of a local area network (LAN) module, Ethernet module, or wired communication module establishing communication using a pair cable, a coaxial cable, an optical cable, or the like. According to an embodiment, the communication interface 120 may use the same communication module (for example, Wi-Fi module) to communicate with an external device such as a remote controller and an external server. According to another embodiment, the communication interface 120 may use a different communication module (for example, Wi-Fi module) for communicating with an external device such as a remote controller and an external server. For example, the communication interface 120 may use at least one of an Ethernet module or a Wi-Fi module to communicate with an external server, and may use a Bluetooth (BT) module to communicate with an external device such as a remote controller. However, this is merely exemplary, and the communication interface 120 may use at least one communication module among various communication modules when communicating with a plurality of external devices or an external server.

The speaker 150 may be an element to audibly output various audio data, various alarm sounds, a voice message, or the like, which are processed by the input and output interface 180. The electronic apparatus 100 may include an audio output device such as the speaker 150 or may include an output device such as an audio output terminal. The speaker 150 may output a sound feedback for guiding an operation of a user for communication connection with the external user terminal 200 or a voice message guiding that communication connection with the external user terminal 200 is completed.

The user interface 160 is configured to receive a user command to control the electronic apparatus 100. The user interface 160 may be implemented as hardware and software. In the implementation of software, the user interface 160 may include graphics displayed on the display 110 such that the user may interact according to the user interface 160 displayed on the display. In the implementation of hardware, the user interface may include hardware elements such as a button, a touch pad, a mouse, a keyboard, or a touch screen capable of establishing the above-described display function and an operation input function. In the implementation of a touch screen, the user interface 160 may be provided in conjunction with the display 110. The button may be various types of buttons such as a mechanical button, a touch pad, a wheel, and the like formed in an any area of the electronic apparatus such as a front surface portion, a side surface portion, and a back surface portion of the outer area of a main body of the electronic apparatus 100. Naturally, the user interface 160 may be provided in a combination of hardware and software to enable the user to interact with the electronic apparatus 100. The user interface 160 may receive a user command to search the external user terminal 200.

The microphone 170 may receive the user voice in an active state of the microphone 170. For example, the microphone 170 may be integrally formed as an integral unit on a high-level side, a front side direction, a side direction, or the like of the electronic apparatus 100. The microphone 170 may include various configurations such as a microphone for collecting user voice in an analog format, an amplifier circuit for amplifying the collected user voice, an audio-to-digital (A/D) conversion circuit for sampling the amplified user voice to convert into a digital signal, a filter circuitry for removing a noise element from the converted digital signal, or the like. The user voice may be employed to provide input and/or effect control of the electronic apparatus 200 in conjunction with the user interface 160.

The input and output (I/O) interface 180 may input and output at least one of an audio signal and a video signal. The input and output interface 180 and the communication interface 120 may receive an image including at least one of a content and UI from an external device, and output a control command to an external device. The input and output interface 180 may be a high-definition multimedia interface (HDMI), but this is merely exemplary and the input and output interface 180 may be one interface among mobile high-definition link (MHL), universal serial bus (USB), display port (DP), Thunderbolt, video graphics array (VGA) port, RGB port, d-subminiature (D-SUB), digital visual interface (DVI), and the like. According to an embodiment, the input and output interface 180 may include a port for inputting and outputting only an audio signal and a port for inputting and outputting only a video signal, or may be implemented as one port that inputs and outputs both the audio signal and the video signal. The input and output interface 180 may be provided in conjunction with the communication interface 120 to perform communication with an external apparatus, such as the user terminal 200.

A light outputter 190 is configured to output light and may be implemented as an LED, or the like. The light outputter 100 may output light having a preset pattern or a preset cycle as a marker for communication connection between the electronic apparatus 100 and the user terminal 200.

The processor 140 may include one or more among a central processing unit (CPU), a micro controller unit (MCU), a micro processing unit (MPU), a controller, an application processor (AP), a communication processor (CP), and an Advanced Reduced instruction set computing (RISC) Machine (ARM) processor or may be defined as a corresponding term. The processor 140 may be implemented in a system on chip (SoC) type or a large scale integration (LSI) type which a processing algorithm is implemented therein or in a field programmable gate array (FPGA). The processor 140 may perform various functions by executing a computer executable instruction stored therein or in the memory 130.

Figure 4:
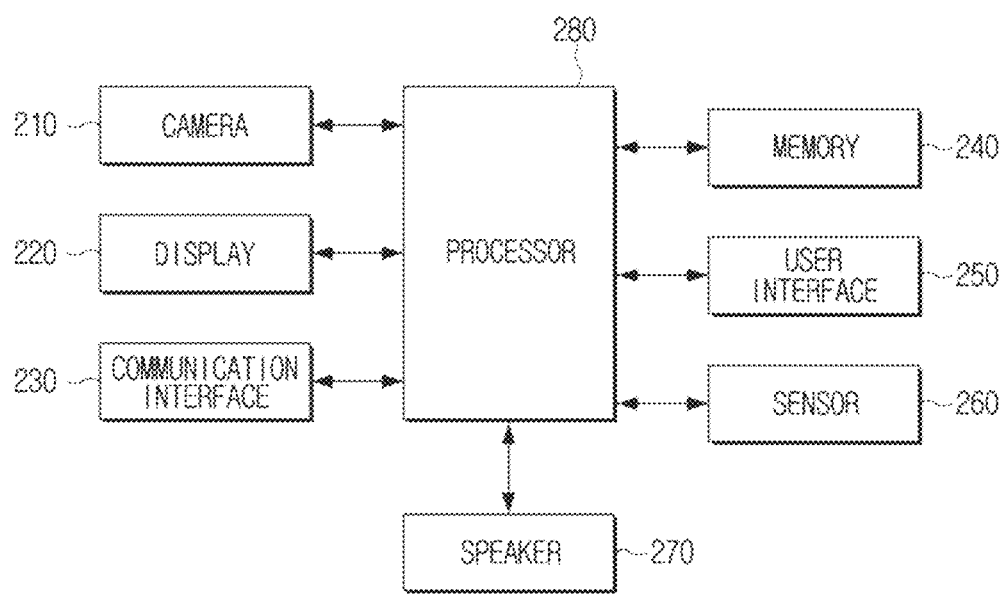
FIG. 4 is a block diagram illustrating a configuration of a user terminal, according to an embodiment.

FIG. 4 is a block diagram illustrating a configuration of the user terminal, according to an embodiment. As illustrated in FIG. 4, the user terminal 200 may include a camera 210, a display 220, a communication interface 230, a memory 240, a user interface 250, a sensor 260, a speaker 270, and a processor 280. Alternatively, some components of the user terminal 200 may be added or omitted according to a type of a user terminal 200. Among the configuration of the user terminal 200 and the configuration of the electronic apparatus 100, the same components having the same name may perform the same or similar functionality and thus, redundant descriptions thereof will be omitted.

The camera 210 is configured to capture an image of an environment the outside of the user terminal 200 and may be provided in at least one region among the front side, upper side, or rear side, but this is merely exemplary. The camera 210 may be electrically connected to the user terminal 200.

When a user input for establishing communication connection with the electronic apparatus 100 is received, the camera 210 (in particular, a camera in a rear side of the user terminal 200) may be automatically activated, and an image including the electronic apparatus 100 outputting a marker may be captured.

The display 220 may display images obtained from a variety of sources. In particular, the display 200 may display UI screens for a communication connection with the electronic apparatus 100 and, in particular, output an image that includes the electronic apparatus 100 that outputs a marker. At this time, the display 200 can display the guide UI for guiding the position of the electronic apparatus 100 along with the image including the electronic apparatus 100 outputting the marker.

The communication interface 230 may establish communication with various external electronic apparatuses. The communication interface 230 may receive a scanning signal from the electronic apparatus 100 and may transmit a signal for resuming communication connection in response to a scanning signal. The communication interface 230 may receive a signal requesting authentication of the electronic apparatus 100 from the electronic apparatus 100, and transmit a signal for confirming authentication with respect to the electronic apparatus 100 to the electronic apparatus 100 to establish communication connection with the electronic apparatus 100.

The communication interface 230 may include various communication modules (for example, a Wi-Fi module, a Bluetooth module, or the like), and may establish communication connection with the electronic apparatus 100 by various different methods according to a type of a communication module. This will be described with reference to FIGS. 9A and 9B.

The memory 240 may store various instructions or programs for controlling the user terminal 200. In particular, the memory 240 may store an application for establishing a communication connection with the electronic apparatus 100, and may store a predefined marker and a background screen for authenticating the electronic apparatus 100. At this time, the predefined marker may include at least one of text and an image for guiding a user operation for establishing a communication connection, and the background screen may have a predetermined pattern or color.

The user interface 250 may receive a variety of user commands to control the user terminal 200. In particular, the user interface 250 may include a touch panel and a button included in an exterior of the user terminal 200, but this is merely exemplary, and the user interface 250 may be implemented as another input device. The user interface 250 may also receive a user input requesting a communication connection with a pop-up menu to confirm the communication connection.

The sensor 260 may sense various environments around the user terminal 200. In particular, various status information of the user terminal 200 may be sensed. For example, the sensor 260 may include a motion sensor (for example, a gyro sensor, an acceleration sensor, etc.) capable of sensing motion information of the user terminal 200, and may include a sensor (for example, a Global Positioning System (GPS) sensor) capable of sensing location information, a sensor (for example, a temperature sensor, a humidity sensor, a pneumatic sensor, etc.) capable of sensing environmental information about the user terminal 200, a sensor capable of sensing biometric information of a user of the user terminal 200, and the like. Specifically, the sensor 260 may include an image sensor for obtaining face information, an iris sensing sensor for obtaining iris information, and a fingerprint sensor for obtaining fingerprint information of the user as the biometric information.

The speaker 270 may be an element to output various audio data, various alarm sounds, a voice message, or the like, which are received from through various external sources. The user terminal 200 may include an audio output device, such as the speaker 270, or may include an output device, such as an audio output terminal. The speaker 270 may output a voice message for guiding a user's operation for communication connection with the external electronic apparatus 100 or a voice message guiding that communication connection with the external electronic apparatus 100 is completed.

The processor 280 may control the overall operation of the user terminal 200 by executing instructions stored therein or in the memory 240. In particular, when the electronic apparatus 100 is searched through the communication interface 230, the processor 280 may control the display 220 to display a menu to confirm a communication connection with the electronic apparatus 100. When a user input for a communication connection is received through a menu, the processor 280 may activate the camera 210 and control the display 220 to display a screen including an image captured by the activated camera 210. If the electronic apparatus 100 is authenticated through a predefined marker included in the image, the processor 280 may transmit a signal to confirm authentication for the electronic apparatus 100 via the communication interface 230 and establish a communication connection with the electronic apparatus 100.

The processor 280 may analyze the marker. For example, the processor may analyze one or more of a text included in the marker, an image included in the marker, a position of the marker, a color of the marker, etc. If the marker captured by the camera 210 matches a marker stored in the memory 240, for example if at least one of the text or the image included in the analysis result marker corresponds to at least one of the text or the image pre-stored in the memory 240, the processor 280 may authenticate the electronic apparatus 100 and may control the communication interface 230 to transmit a signal confirming authentication for the electronic apparatus 100 to the electronic apparatus 100. The processor 280 may authenticate the electronic apparatus 100 by analyzing a form of the electronic apparatus 100 included in the image captured with the text and the image included in the marker and the background screen outputted by the electronic apparatus 100.

The processor 280 may control the display 220 to display a guide UI for guiding a position of the electronic apparatus 100 outputting a marker on a screen including an image captured by the camera 210.

The processor 280 may receive information on the electronic apparatus 100 through the communication interface 230 while discovering the electronic apparatus 100, and control the display 220 to display information on the electronic apparatus 100 on a screen including an image captured by the camera 210.

When a communication connection with the electronic apparatus 100 is established, the processor 280 may remove an image and control the display 220 to display a message to indicate to the user that the communication connection with the electronic apparatus 100 is completed. Once a predetermined time has elapsed or a user input is received after the message indicating the successful communication connection, the processor 270 may control the display 220 to display the UI for controlling the electronic apparatus 100 according to a type of the electronic apparatus 100.

Figure 5A:
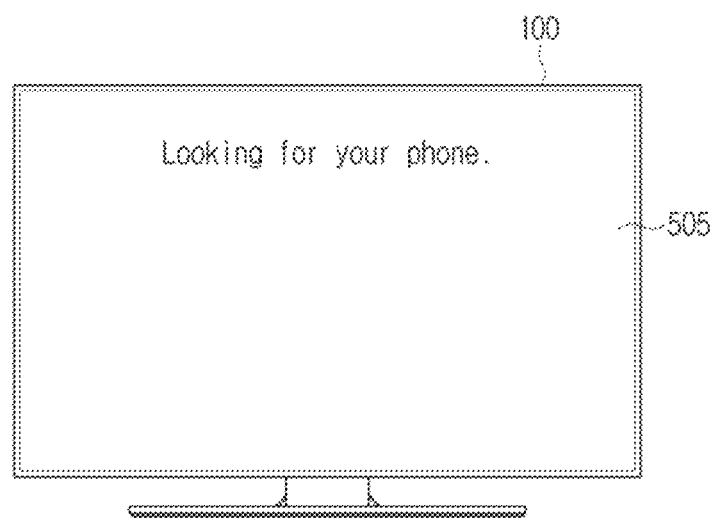
FIG. 5A is a view illustrating a screen provided by an electronic apparatus to discover a user terminal, based on a user input, according to an embodiment.

Referring to FIG. 5A to FIG. 8B, a communication connection process between the electronic apparatus 100 and the user terminal 200 will be described. If a user input for a communication connection with a peripheral device is received, the electronic apparatus 100 may transmit (or broadcast) a scanning signal to discover another device. The electronic apparatus 100, as shown in FIG. 5A, may also display a screen 505 for guiding a discovery of another peripheral device (in particular, the user terminal 200, such as a smart phone). At this time, the scanning information may include information about the electronic apparatus 100 (e.g., the type of the electronic apparatus 100, the identification (ID) of the electronic apparatus, etc.).

Figure 5B:
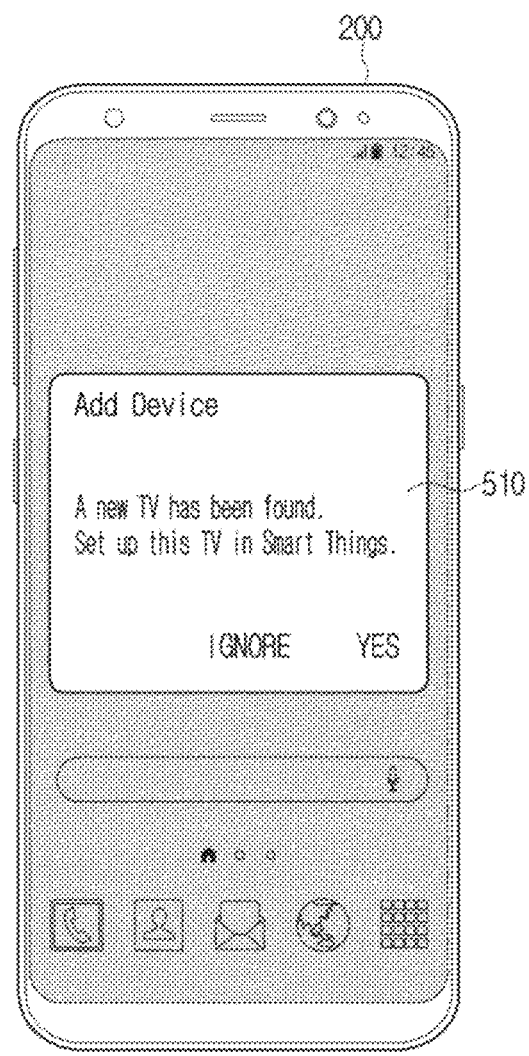
FIG. 5B is a view illustrating a menu provided by a user terminal when an electronic apparatus is discovered, according to an embodiment.

If the user terminal 200 discovers the electronic apparatus 100 by receiving the scanning signal, the user terminal 200 may display a menu for communication connection with the electronic apparatus 100. When the electronic apparatus 100 is initially connected (or paired) with the user terminal 200, the user terminal 200 may display a pop-up menu 510 to confirm the registration (or addition) of the electronic apparatus 100, as shown in FIG. 5B. When a user input (i.e., a user input for registering (or adding) the electronic apparatus 100 via the pop-up menu) for communication connection with the electronic apparatus 100 through the menu is received, the user terminal 200 may transmit a signal for establishing a communication connection to the electronic apparatus 100.

Figure 6A:
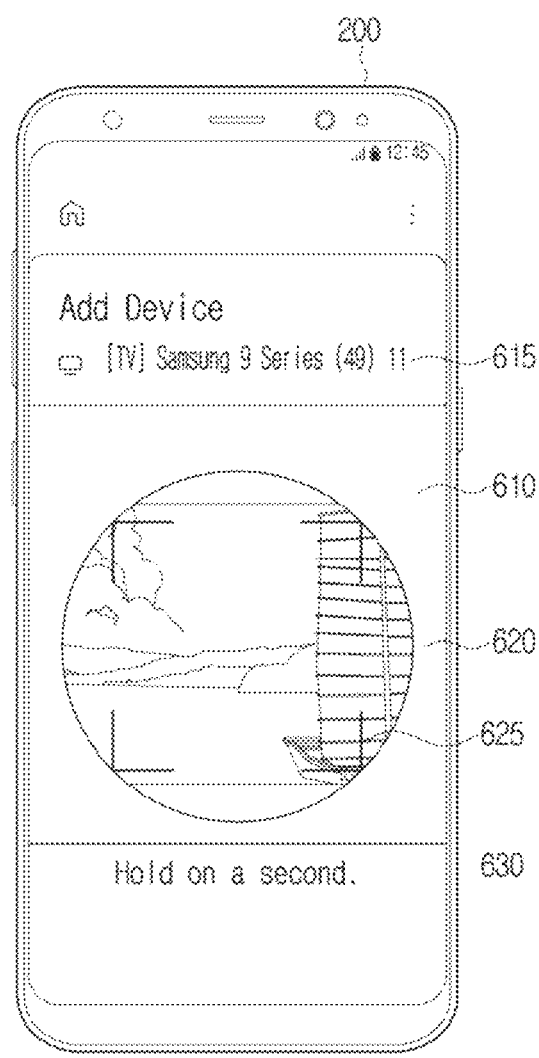
FIG. 6A is a view illustrating a screen including an image captured by a user terminal for communication connection with an electronic apparatus, according to an embodiment.

The user terminal 200 may execute an application for the communication connection and provide an execution screen of the application. The user terminal 200 may activate a camera, in response to a user input for communication connection, and may provide an execution screen 610 including an image captured by a camera as illustrated in FIG. 6A. The execution screen 610 may include information 615 (for example, a type of the electronic apparatus, a product name of the electronic apparatus, information on the size of the electronic apparatus, etc.) on the electronic apparatus 100, an image 620 captured by the camera, a guide UI 625 for guiding a position of the electronic apparatus 100 on the image screen 620, and a guide message 630 for guiding an operation of a user.

Figure 6B:
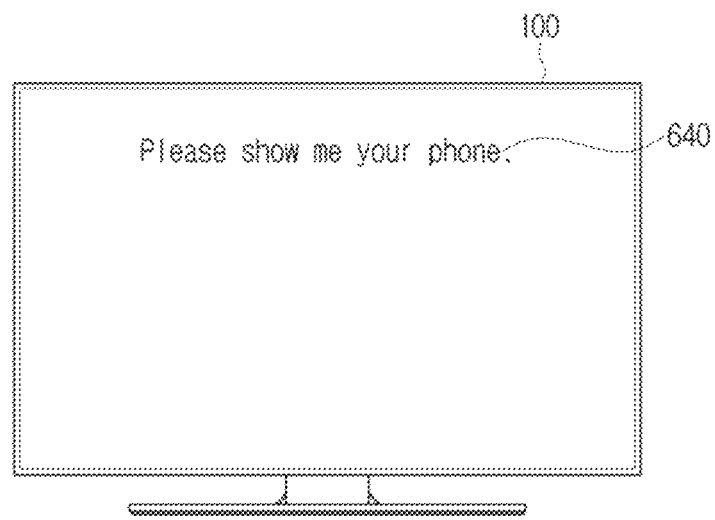
FIG. 6B is a view illustrating a marker provided by an electronic apparatus, according to an embodiment.

When the user terminal 200 is discovered by receiving a signal to establish a communication connection from the user terminal 200, the electronic apparatus 100 may transmit a signal for requesting authentication of the electronic apparatus 100 and display a predetermined marker 640 on a screen, as illustrated in FIG. 6B. The marker 640 may include a text (for example, please show me your phone) for guiding a user's operation for communication connection, but this is merely exemplary, and the marker may further include an image or graphic.

Figure 7A:
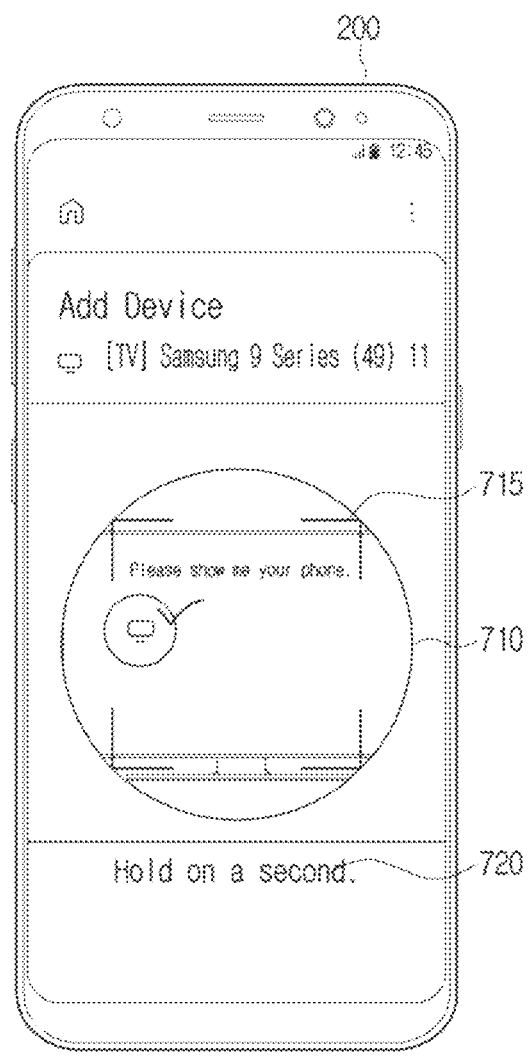
FIG. 7A is a view illustrating a screen including an image captured by a user terminal for communication connection with an electronic apparatus, according to an embodiment.

If the electronic apparatus 100 displaying the marker 640 is included in the image captured by the camera 210 by the user's operation, the user terminal 200 may analyze the marker 640 included in the image, and authenticate the electronic apparatus 100 by comparing the information on the marker 640 obtained as a result of the analysis with pre-stored information about the marker. Specifically, as illustrated in FIG. 7A, when the electronic apparatus 100 outputting the marker included in the image 710 captured by the camera 210 matches the guide UI 715 or is included in the guide UI 715, the user terminal 200 may analyze the marker 640 included in the captured image 710. At this time, the user terminal 200 can analyze the image information of the marker 640, but this is only one embodiment. The user terminal 200 may obtain the text information included in the marker 640 through optical character recognition (OCR) for the marker 640. The user terminal 200 may authenticate the electronic apparatus 100 by comparing information (image information or text information) of the analyzed marker 640 with pre-stored information about the marker 640. At this time, the pre-stored marker may be different according to a type of the electronic apparatus 100. In addition to the marker 640, the user terminal 200 can authenticate the electronic apparatus 100 by analyzing the format of the electronic apparatus 100 and the background information output by the electronic apparatus 100. At this time, the format of the electronic apparatus 100 and the background information outputted by the electronic apparatus 100 can be pre-stored. When the electronic apparatus 100 outputting the marker 640 in the image 710 captured by the camera 210 matches the guide UI 715 or is included in the guide UI 715, the user terminal 200 may display a guide message (for example, hold on a second) for guiding a user's operation for authentication in an application screen.

When the user terminal 200 authenticates the electronic apparatus 100 using the marker 640, the user terminal 200 may transmit a signal for confirming authentication of the electronic apparatus 100 to the electronic apparatus 100.

Figure 7B:
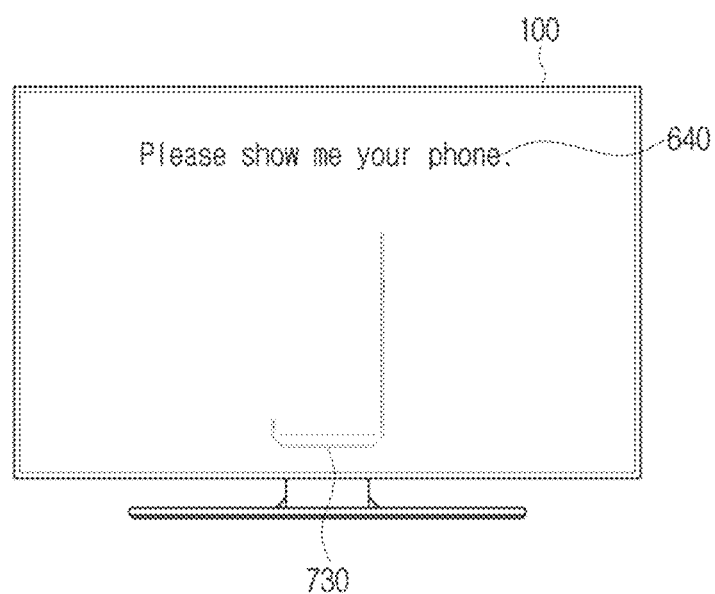
FIG. 7B is a view illustrating a screen for guiding a connection progress by an electronic apparatus when an authentication result is received from a user, according to an embodiment.

For a predetermined time before or after receiving the signal for confirming the electronic apparatus 100, the electronic apparatus 100 may display a guide UI 730 indicating that authentication of the electronic apparatus 100 is being established, as illustrated in FIG. 7B.

Figure 8A:
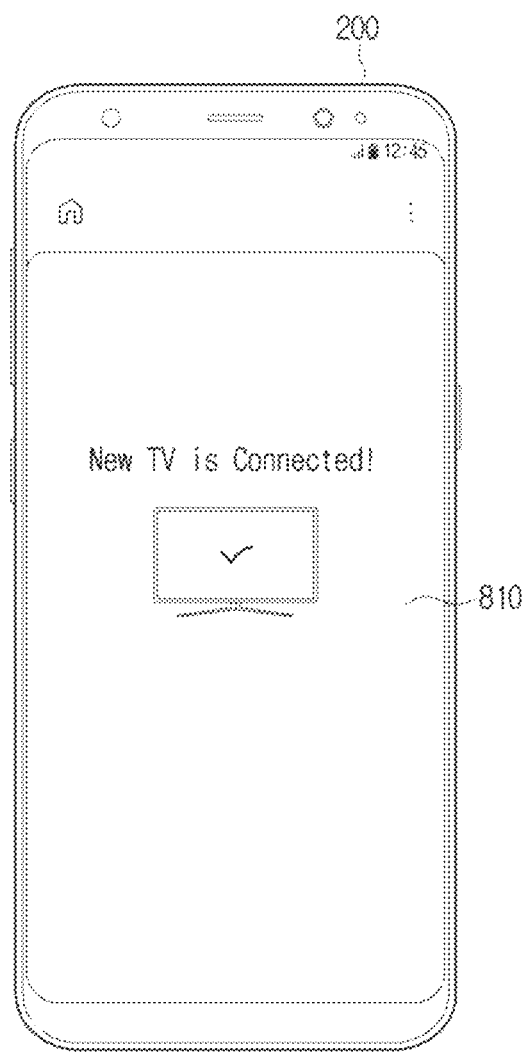
FIG. 8A is a view illustrating a screen provided by a user terminal after a communication connection with an electronic apparatus is established, according to an embodiment.
Figure 8B:
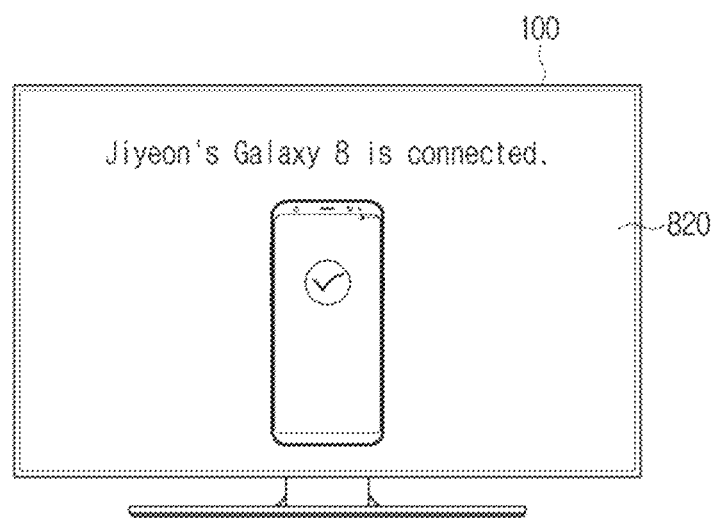
FIG. 8B is a view illustrating a screen provided by an electronic apparatus after a communication connection with a user terminal is established, according to an embodiment.

If a signal confirming authentication of the electronic apparatus 100 is received, the electronic apparatus 100 may establish a communication connection with the user terminal 200 in response to the signal. The user terminal 200 may register information (e.g., ID, product name, address information of the electronic apparatus 100, or the like) on the electronic apparatus 100 and as shown in FIG. 8A, the user terminal 200 may delete an image captured by the camera 210 and display a screen 810 for guiding the completion of communication connection (or completion of registration). The electronic apparatus 100 may register information about the user terminal 200 (ID, product name, address information, etc. of the user terminal 200), and as illustrated in FIG. 8B, may remove the marker 640, and display a screen 820 for guiding the completion of the communication connection (or completion of registration). At this time, the electronic apparatus 100 may provide information about the user terminal 200 (the name of a user using the user terminal 200, the product name of the user terminal 200, etc.) on the screen 820 for guide the completion of the communication connection.

Through the process described above, by authenticating the electronic apparatus 100 by capturing the electronic apparatus 100 outputting the marker 640 through the user terminal 200, a user may more intuitively and conveniently establish a communication connection between the electronic apparatus 100 and the user terminal 200.

Figure 9B:
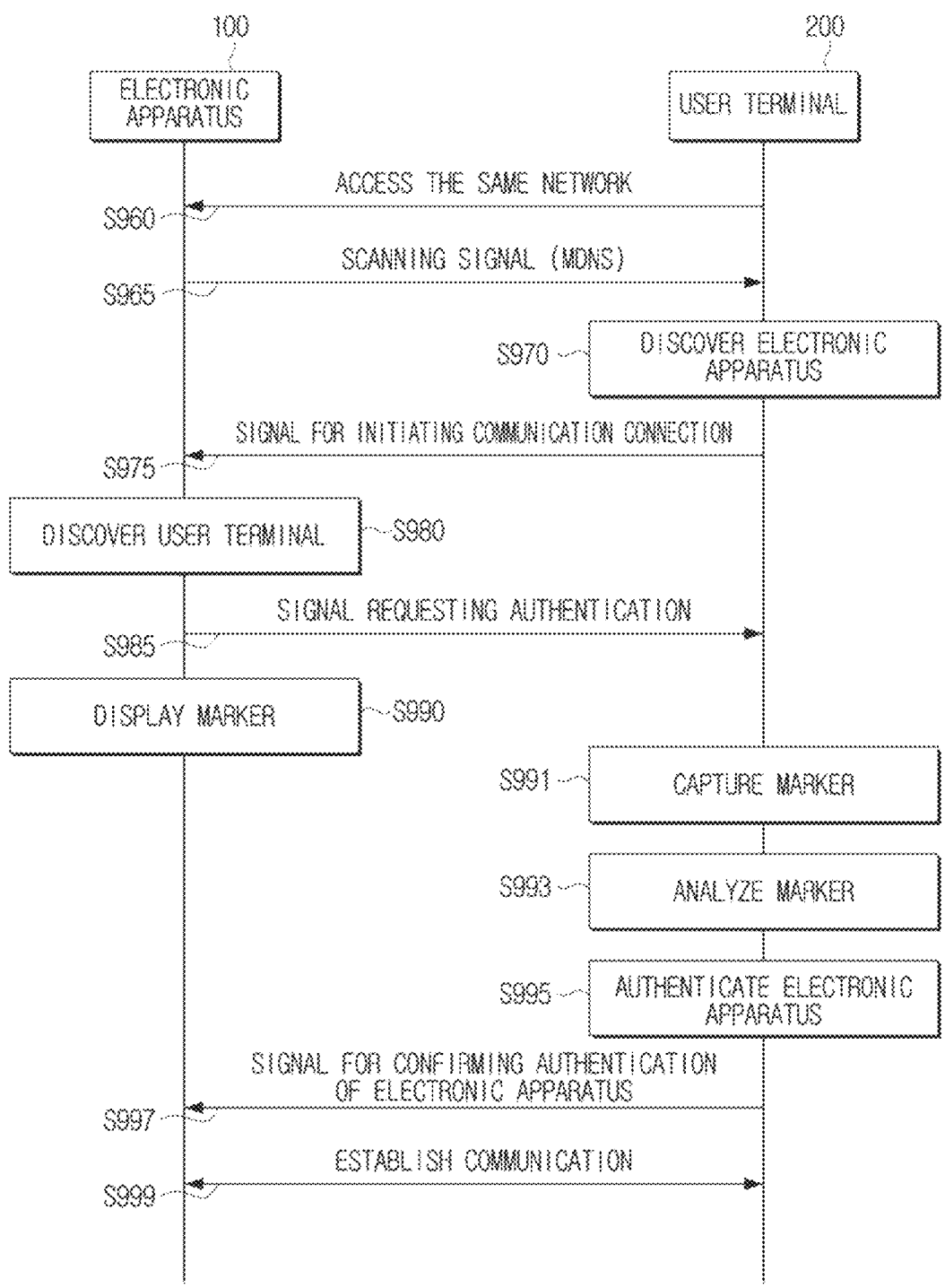
FIG. 9B is a sequence diagram illustrating a process for establishing a communication connection using a Wi-Fi module, according to an embodiment.

With reference to FIGS. 9A and 9B, a process of establishing a communication connection according to a type of a communication interface will be described below.

FIG. 9A is a sequence diagram illustrating a process for establishing a communication connection using a Bluetooth module, according to an embodiment.

The electronic apparatus 100 may transmit a scanning signal according to a user input for establishing a communication connection in operation S905. The scanning signal may be a broadcasting signal generated by a Bluetooth low energy (BLE) signal. The scanning signal may include information on the electronic apparatus 100 (for example, ID, type, product name, address information of the electronic apparatus 100, etc.).

When the scanning signal is received, the user terminal 200 may identify that the electronic apparatus 100 is discovered in operation S910.

The user terminal 200 may transmit a signal to initiate a communication connection to the electronic apparatus 100 in operation S915. The user terminal 200 may transmit a signal including information (ID, product name, address information, etc. of the user terminal 200) on the user terminal 200.

When a signal for the communication connection is received, the electronic apparatus 100 may determine that the user terminal 200 is discovered in operation S920.

The electronic apparatus 100 may transmit, to the user terminal 200, a signal requesting authentication of the electronic apparatus 100 in operation S925, and display a marker in operation S930. The marker may include at least one of a text or an image for guiding a user's operation for establishing communication between the electronic apparatus 100 and the user terminal 200 as described above.

The user terminal 200 may capture an image including the marker by activating a camera in operation S935, and analyze the captured marker in operation S940. The user terminal 200 may analyze the marker and also the appearance of the electronic apparatus 100 that is displaying the marker or the background screen output by the electronic apparatus 100.

The user terminal 200 may authenticate the electronic apparatus 100 based on the analysis result in operation S945. Specifically, the user terminal 200 may authenticate the electronic apparatus 100 by comparing information about a text or an image included in the marker and pre-stored information about the marker. The user terminal 200 may store information about a marker according to the type of the electronic apparatus 100, and can store information about an appearance of the electronic apparatus 100 and the background output by the electronic apparatus 100 as well as a text or an image included in the marker. That is, the user terminal 200 may authenticate the electronic apparatus 100 using information about a text or an image included in the marker and information about the appearance of the electronic apparatus 100 and the background output by the electronic apparatus 100.

When the electronic apparatus 100 is authenticated, the user terminal 200 may transmit a signal confirming authentication of the electronic apparatus 100 to the electronic apparatus 100 in operation S950.

The electronic apparatus 100 may establish communication connection with the user terminal 200 in response to the signal for confirming authentication of the electronic apparatus 100 in operation S955.

FIG. 9B is a sequence diagram illustrating a process for establishing a communication connection using a Wi-Fi module, according to an embodiment.

The electronic apparatus 100 and the user terminal 200 may access the same network in operation S960.

The electronic apparatus 100 may transmit the scanning signal to the user terminal 200 in operation S965. At this time, the scanning signal can be transmitted by a Multicast Plan Domain Name System (MDNS) method. The MDNS is a service for finding a host name without setting up in a local network area, and may transmit an IP-based multicast query message. The query message may include a host name, an IP address, information about the electronic apparatus 100, or the like.

When a scanning signal is received, the user terminal 200 may identify that the electronic apparatus 100 is discovered in operation S970.

The user terminal 200 may transmit, to the electronic apparatus 100, a response signal to initiate a communication connection in operation S975. The response signal may include information on the user terminal 200 (ID, type, product name, address information of the user terminal 200).

When a signal for resuming communication connection is received, the electronic apparatus 100 may determine that the user terminal 200 is discovered in operation S980.

The electronic apparatus 100 may transmit, to the user terminal 200, a signal requesting authentication of the electronic apparatus 100 in operation S985, and display a marker in operation S990. The marker may include at least one of a text and an image for guiding a user's operation for establishing communication between the electronic apparatus 100 and the user terminal 200 as described above.

The user terminal 200 may activate a camera and capture an image including a marker in operation S991 and analyze the captured marker in operation S993.

The user terminal 200 may authenticate the electronic apparatus 100 based on the analysis result in operation S995.

When the electronic apparatus 100 is authenticated, the user terminal 200 may transmit, to the electronic apparatus 100, a signal confirming authentication of the electronic apparatus 100 in operation S997. The electronic apparatus 100 may establish a communication connection with the user terminal 200 in response to the signal for confirming authentication of the electronic apparatus 100 in operation S999.

The above-described embodiment has been described as displaying a marker including a text and an image for guiding a user's operation by the electronic apparatus 100 for communication connection, but the embodiment is only exemplary. A device not including a display may also emit light through the light outputter 190 as the marker.

A process of communication connection between the electronic apparatus and the user terminal using light output will be described with reference to FIGS. 10 and 11.

Figure 10:
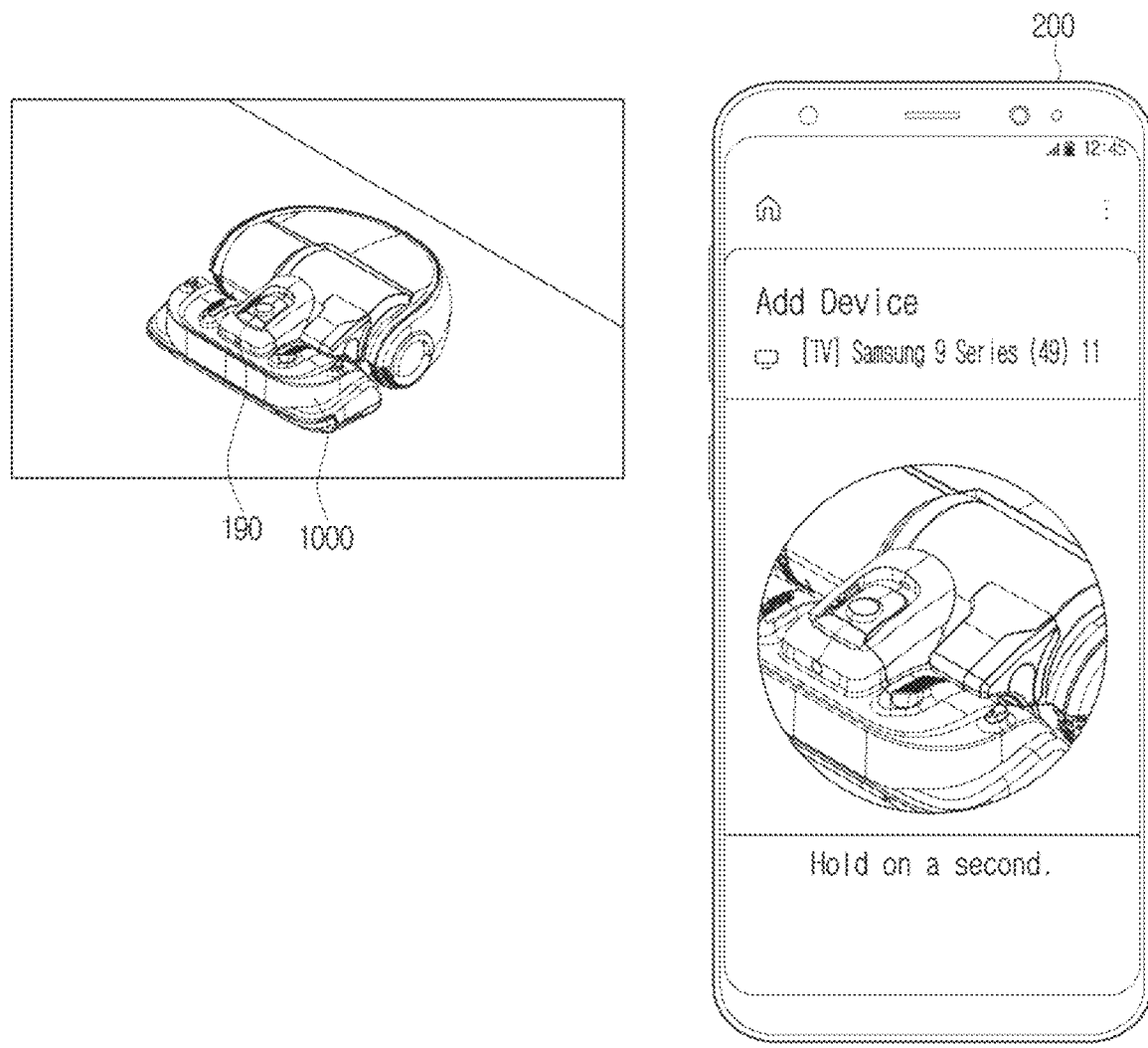
FIG. 10 is a view illustrating a process for establishing a communication connection between an electronic apparatus and a user terminal using light output, according to an embodiment.

As illustrated in FIG. 10, an electronic apparatus 1000 and the user terminal 200 can establish a communication connection using a specific pattern of light that is emitted through the light outputter 190 of the electronic apparatus 1000. Specifically, when the user terminal 200 is discovered, the electronic apparatus 1000 may output light having a specific pattern or a specific period as the marker. At this time, as the marker, the electronic apparatus 1000 may store information about light having a specific pattern or a specific period according to the type of the electronic apparatus 1000. As shown in FIG. 10, the user terminal 200 may establish authentication for the electronic apparatus 1000 by capturing a light output having a specific pattern or a specific period.

Figure 11:
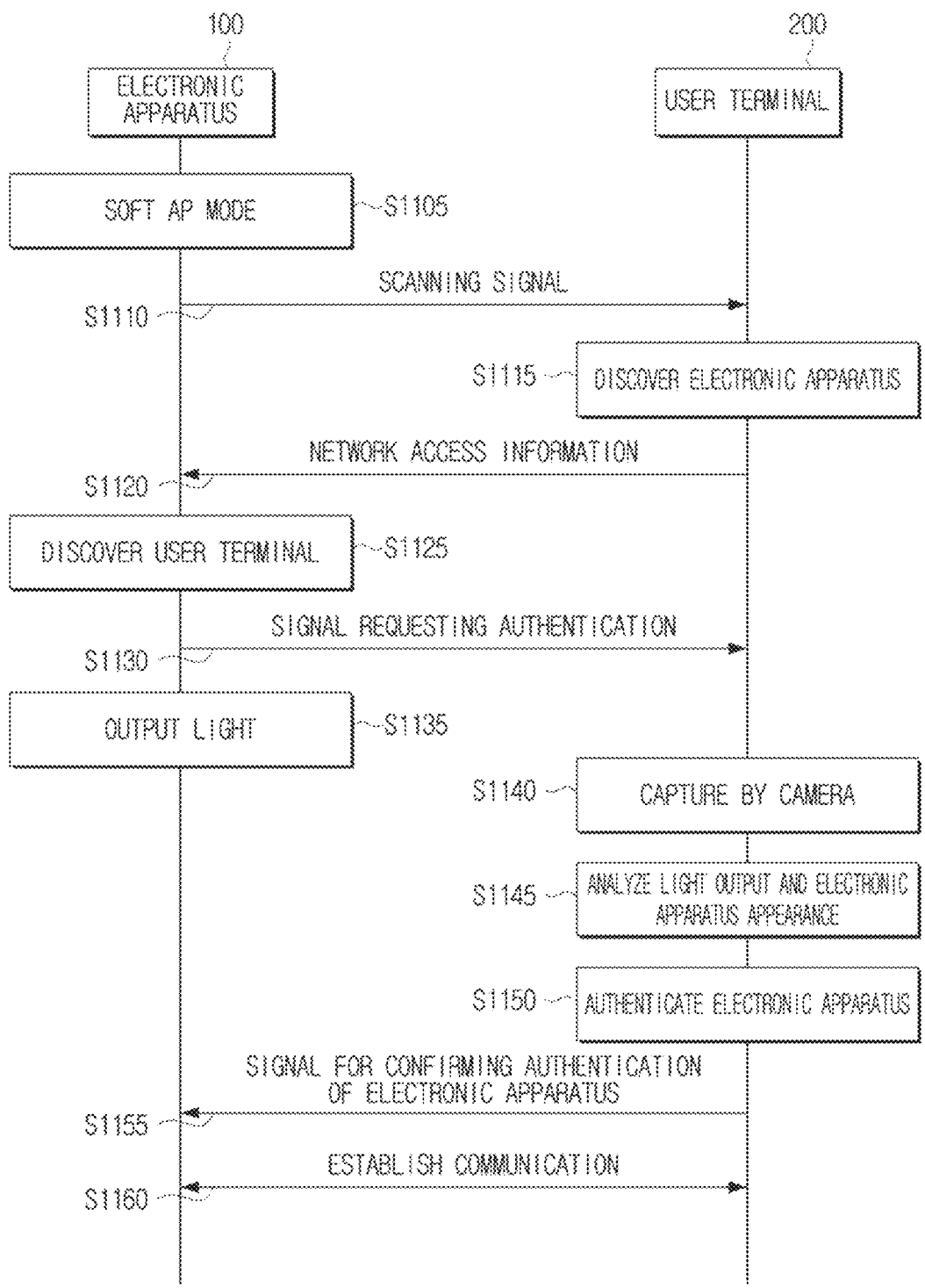
FIG. 11 is a sequence diagram illustrating a process for establishing a communication connection between an electronic apparatus and a user terminal using light output, according to an embodiment.

FIG. 11 is a sequence diagram illustrating a process for establishing a communication connection between an electronic apparatus and a user terminal using light output, according to an embodiment.

An electronic apparatus 1000 may enter a soft access point (AP) mode in operation S1105. The soft AP mode is a mode in which a device may access an external network through a device communicably connected to an external network (for example, Wi-Fi network).

The electronic apparatus 1000 may transmit a scanning signal to the user terminal 200 in operation S1110.

The user terminal 200 may discover the electronic apparatus 1000 in operation S1115, and transmit network access information to the electronic apparatus 1000 in response to the scanning signal in operation S1120.

The electronic apparatus 1000 may discover the user terminal 200 in response to the network access information in operation S1125 and may transmit a signal requesting authentication to the user terminal 200 in operation S1130.

The electronic apparatus 1000 may output a predetermined pattern of light stored in the electronic apparatus 1000. At this time, the user terminal 200 may capture an image of the electronic apparatus 1000 through the camera in operation S1140, and analyze the light output included in the captured image and the appearance of the electronic apparatus 1000 in operation S1145.

The electronic apparatus 1000 may authenticate the electronic apparatus 1000 based on the analysis result in operation S1150. Specifically, the electronic apparatus 1000 may authenticate the electronic apparatus 1000 by comparing the information on the pattern of light and the appearance of the electronic apparatus 1000 obtained based on the analysis result with pre-stored information about the pattern of light and the appearance of the electronic apparatus 1000.

When the electronic apparatus 1000 is authenticated, the user terminal 200 may transmit a signal confirming authentication on the electronic apparatus 1000 in operation S1155, and the electronic apparatus 1000 and the user terminal 200 may establish a communication connection in operation S1160.

It is described that the electronic apparatus 1000 does not include a display, but this is only one embodiment. The electronic apparatus 1000 may include both a display and a light outputter, and may output both a first marker including at least one of a text and an image for guiding the operation of a user output by the display and a second marker as a specific pattern by using the light outputter. The user terminal 200 may establish authentication for the electronic apparatus 1000 by analyzing both the first marker and the second marker.

In the above-described embodiment, information on a light having a predefined output pattern is pre-stored, but this is merely exemplary. The electronic apparatus 1000 or the user terminal 200 may transmit information about the output pattern in the discovery process. Specifically, the electronic apparatus 1000 may be authenticated by transmitting information on the output pattern of the electronic apparatus 100 (here, the pattern may be predefined or randomly generated) by the user terminal 200 to the electronic apparatus 1000 in advance, outputting light by the electronic apparatus 1000 based on information received from the user terminal 200, and determining by the user terminal 200 whether the output pattern of light output by the electronic apparatus 1000 obtained by the camera matches the output pattern of light included in the information transmitted to the electronic apparatus 1000. Alternatively, the electronic apparatus 1000 may be authenticated by outputting light by the electronic apparatus 1000 in a predefined or randomly generated output pattern, transmitting information on the output pattern of light to the user terminal 200, and determining by the user terminal 200 whether output pattern of light output by the electronic apparatus 1000 obtained through a camera matches output pattern of light included in the information received from the electronic apparatus 100.

Figure 12:
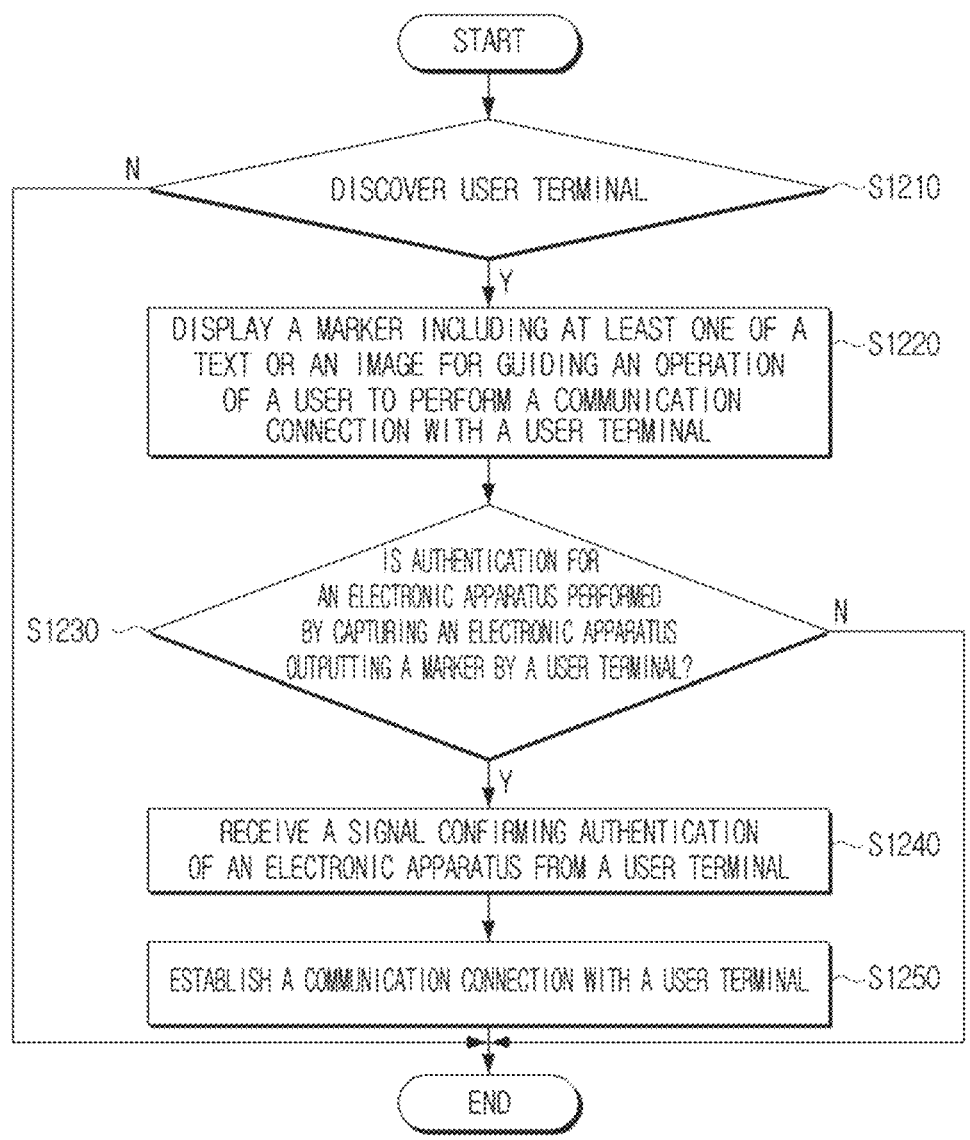
FIG. 12 is a flowchart illustrating a method of controlling an electronic apparatus, according to an embodiment.

FIG. 12 is a flowchart illustrating a method of controlling an electronic apparatus, according to an embodiment.

The electronic apparatus 100 may determine whether the user terminal 200 has been discovered in operation S1210. Specifically, the electronic apparatus 100 may transmit a scanning signal, determine whether a signal for initiating a communication connection is received in response to the transmitted scanning signal, and determine whether the user terminal 200 has been discovered.

If the user terminal 200 is discovered in operation S1210-Y, the electronic apparatus 100 may display a marker including at least one of a text and an image for guiding the operation of the user to establish a communication connection with the user terminal 200 in operation S1220. The marker is previously stored in the electronic apparatus 100, and can be determined according to the type of the electronic apparatus 100.

If the user terminal 200 captures an image of the electronic apparatus outputting a marker and performs authentication for the electronic apparatus 100 in operation S1230-Y, the electronic apparatus 100 may receive a signal for confirming the authentication of the electronic apparatus 100 transmitted from the user terminal 200 in operation S1240. If the marker of the electronic apparatus 100 matches the marker stored in the user terminal 200, the user terminal 200 may establish authentication for the electronic apparatus 100, and the electronic apparatus 100 may receive a signal confirming the authentication of the electronic apparatus 100 transmitted by the user terminal 200.

The electronic apparatus 100 may establish communication with the user terminal 200 in operation S1250.

Figure 13:
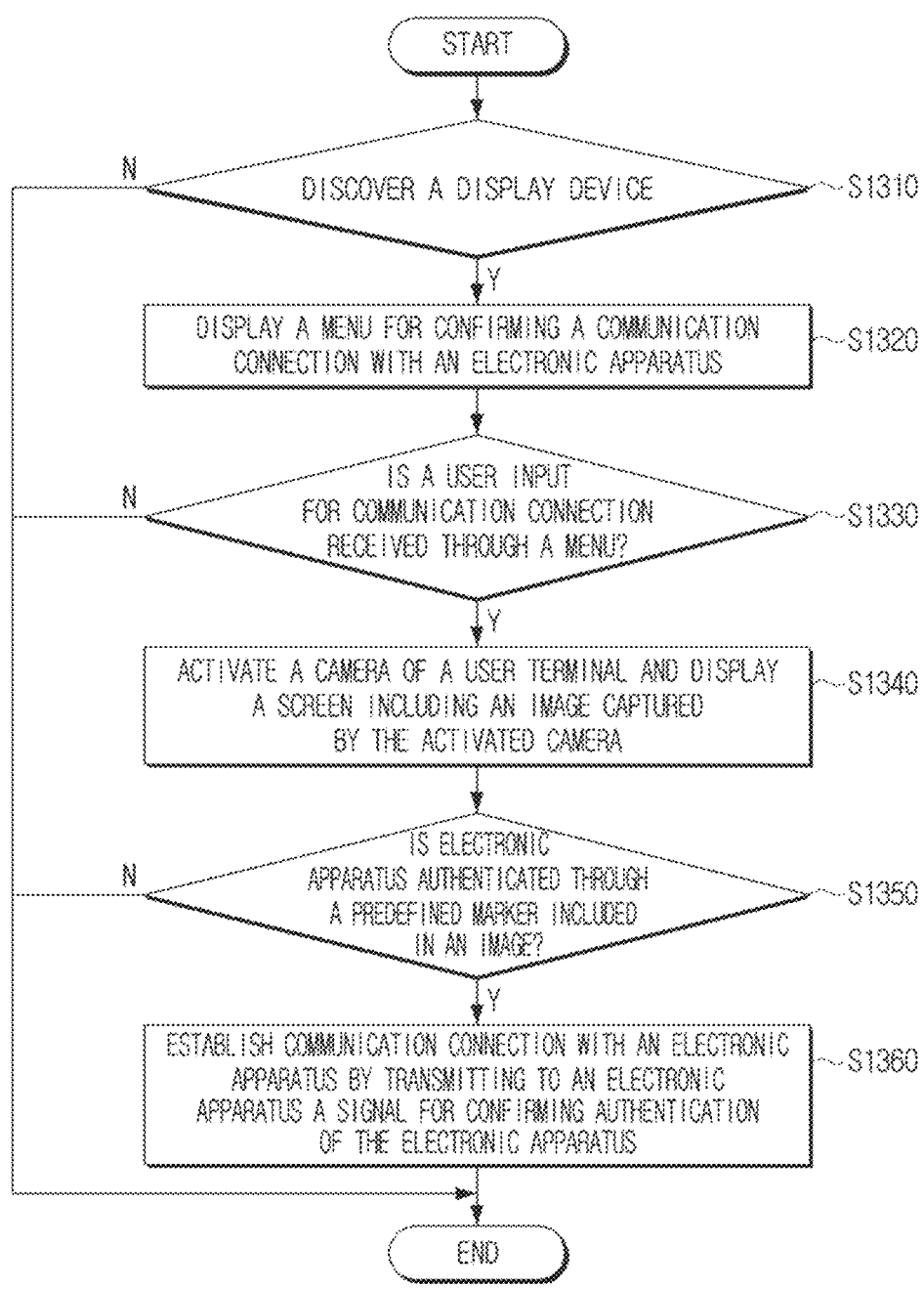
FIG. 13 is a flowchart to describe a method of controlling a user terminal according to an embodiment.

FIG. 13 is a flowchart to describe a method of controlling the user terminal 200 according to an embodiment.

The user terminal 200 may determine whether the electronic apparatus 100 has been discovered in operation S1310. The user terminal 200 may determine whether the user terminal 200 is discovered according to whether a scanning signal transmitted by the electronic apparatus 100 is received.

If the electronic apparatus 100 is discovered in operation S1310, the user terminal 200 may display a menu for confirming a communication connection with the electronic apparatus 100 in operation S1320. At this time, if the electronic apparatus 100 is discovered, the user terminal 200 may display a menu for confirming the communication connection through the application for the communication connection.

If the user input for the communication connection is received through the menu in operation S1330-Y, the user terminal 200 may activate the camera of the user terminal 200 and display a screen including the image captured by the activated camera in operation S1340. At this time, a guide UI for guiding the position of the electronic apparatus 100 outputting the marker may be included on the screen.

If the electronic apparatus 100 is authenticated through the pre-defined marker included in the image in operation S1350-Y, the user terminal 200 may transmit a signal confirming the authentication of the electronic apparatus 100 to the electronic apparatus 100 to establish the communication with the electronic apparatus 100 in operation S1360. Specifically, if the marker included in the image matches the marker pre-stored in the user terminal 200, the user terminal 200 may authenticate the electronic apparatus 100 and transmit a signal confirming the authentication of the electronic apparatus 100 to the electronic apparatus 100 to establish the communication connection with the electronic apparatus 100.

In the above-described embodiment, it has been described that the electronic apparatus 100 outputs a marker, and the user terminal 200 authenticates the electronic apparatus 100 by capturing the output marker, but this is merely exemplary. The user terminal 200 may capture the electronic Apparatus 100 to provide the electronic apparatus 100 with various services.

Figure 14A:
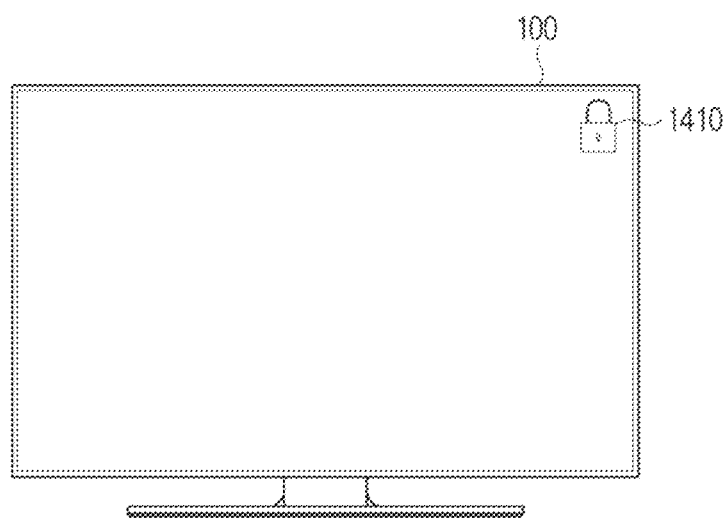
FIG. 14A is a view illustrating a method of unlocking an electronic apparatus by capturing the electronic apparatus in a lock state, according to an embodiment.
Figure 14B:
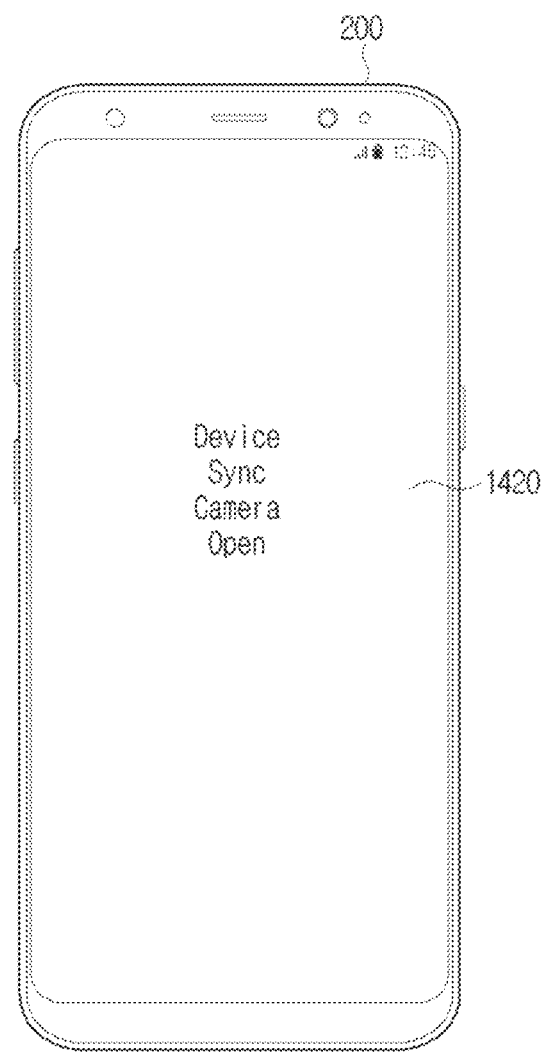
FIG. 14B is a view illustrating a method of unlocking an electronic apparatus by capturing the electronic apparatus in a lock state, according to an embodiment.
Figure 14C:
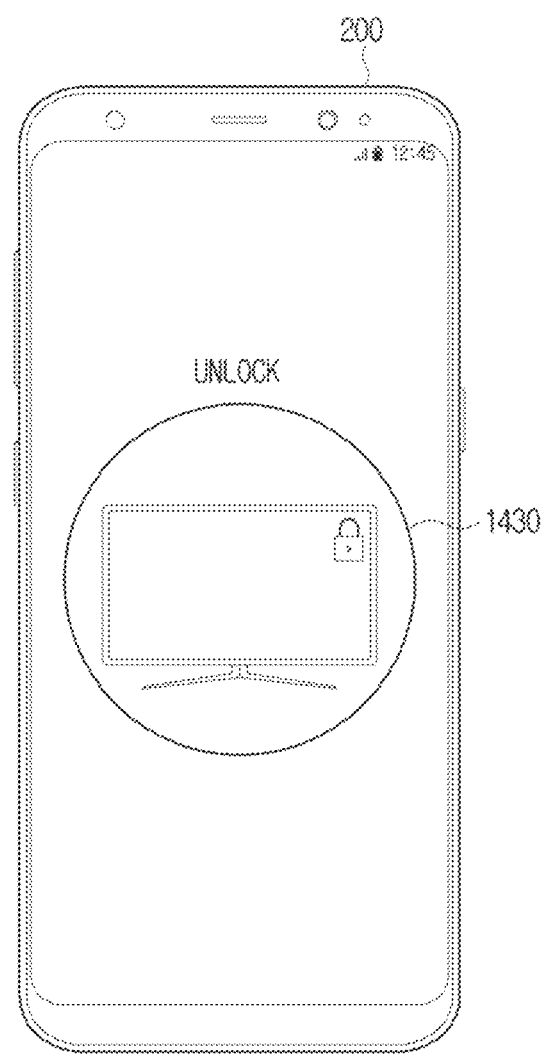
FIG. 14C is a view illustrating a method of unlocking an electronic apparatus by capturing the electronic apparatus in a lock state, according to an embodiment.

FIGS. 14A to 14C are views illustrating a method of unlocking an electronic apparatus by capturing an image of the electronic apparatus in a lock state, according to an embodiment.

The user terminal 200 may transmit the contents (e.g., pictures, videos, etc.) stored or reproduced by the user terminal 200 to the electronic apparatus 100 to provide the user with the service to provide contents through the electronic apparatus 100. Because the content that the user terminal 200 stores or reproduces may include personal information to be protected, the electronic apparatus 100 may provide a screen lock function. That is, the electronic apparatus 100 can receive and provide content from the user terminal 200 only when the user terminal 200 is nearby.

If the electronic apparatus 100 is in a lock state (or a lock mode) not providing content of the user terminal 200, the electronic apparatus 100 may display an indicator 1410 representing the lock state as illustrated in FIG. 14A.

If a user command is input to execute an application for executing content stored or reproduced in the user terminal 200 through the electronic apparatus 100 while the electronic apparatus 100 is in a lock state, the user terminal 200, as shown in FIG. 14B, may display a guide message 1420 for activating the camera for synchronization among devices.

The user terminal 200 may activate a camera and provide a screen including an image 1430 that captures the electronic apparatus 100 outputting the indicator 1410 as illustrated in FIG. 14C. At this time, a guide UI for guiding the position of the electronic apparatus 100 may be included in the screen.

The user terminal 200 may compare the indicator 1410 included in the image 1430 and the appearance of the electronic apparatus 100 outputting the indicator 1410 with the pre-stored image to authenticate the electronic apparatus 100 in the lock state. When the electronic apparatus 100 is authenticated, the user terminal 200 may transmit a signal confirming authentication for the electronic apparatus 100, and the user terminal 200 and the electronic apparatus 100 may establish a communication connection.

The lock state of the electronic apparatus 100 may be released, and the content currently reproduced by the user terminal 200 or the content to which a reproduction command is input by a user may be received from the user terminal 200. The electronic apparatus 100 may provide content received from the user terminal 200.

Figure 15A:
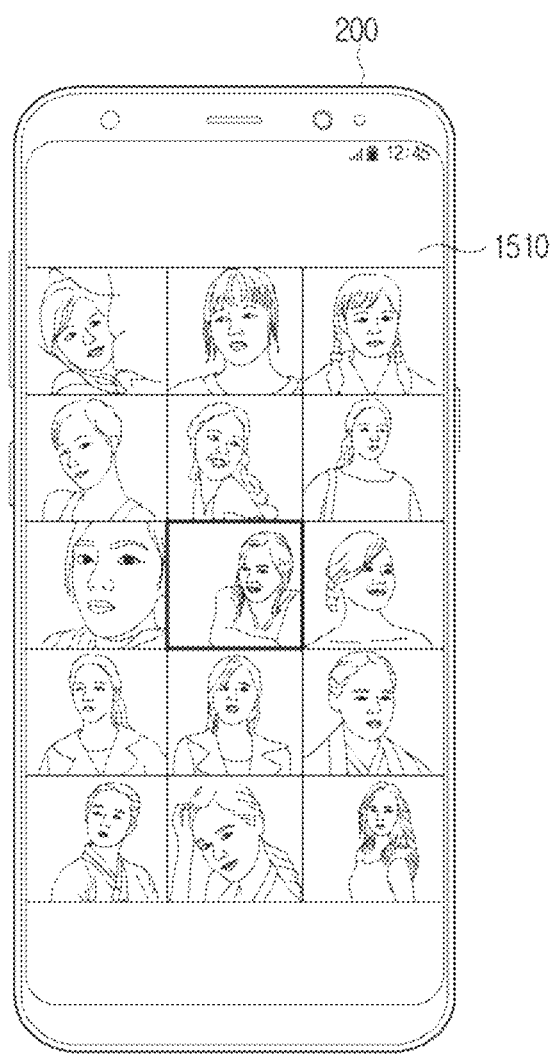
FIG. 15A is a view illustrating a method of sharing content by capturing an electronic apparatus according to an embodiment.
Figure 15B:
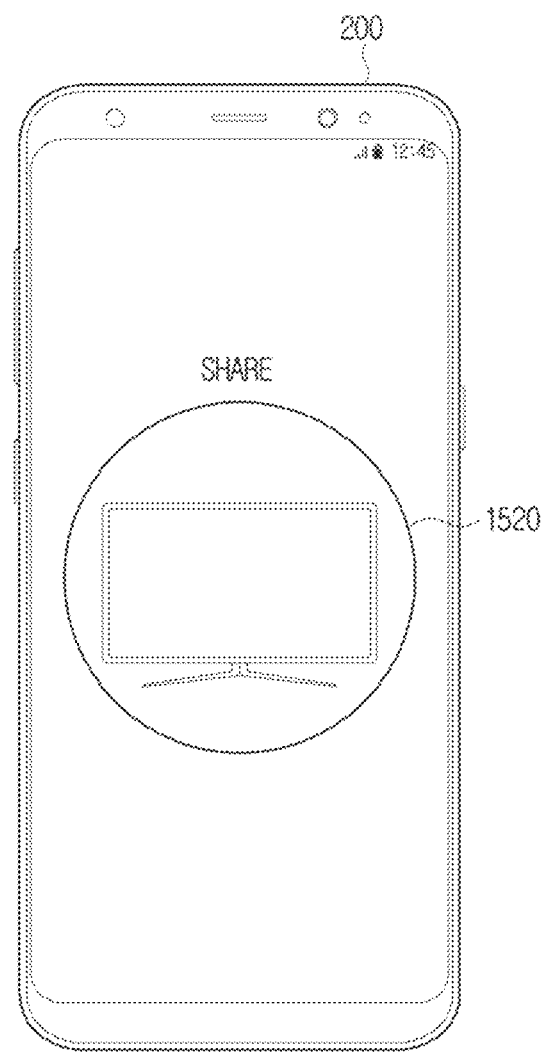
FIG. 15B is a view illustrating a method of sharing content by capturing an electronic apparatus according to an embodiment.
Figure 15C:
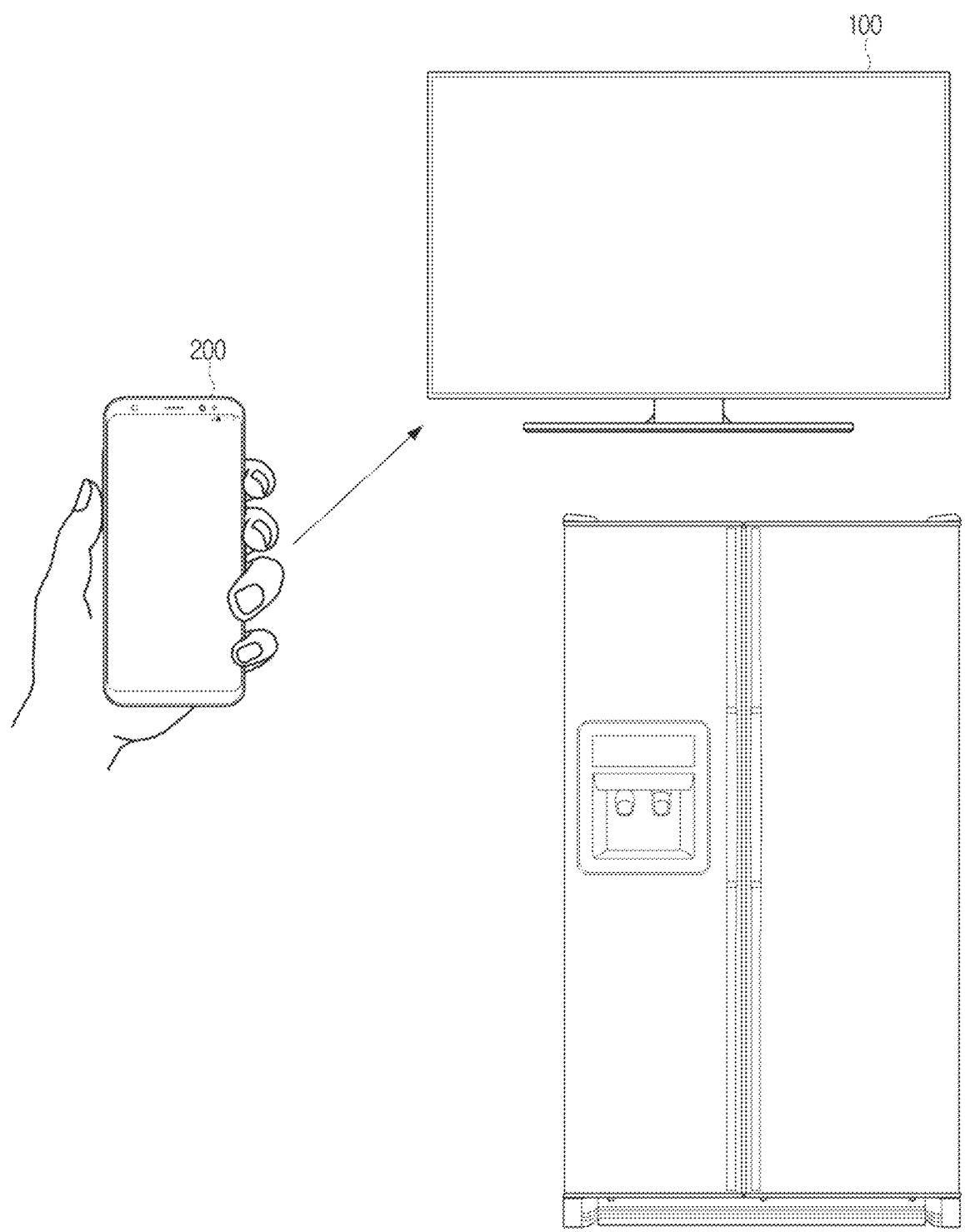
FIG. 15C is a view illustrating a method of sharing content by capturing an electronic apparatus according to an embodiment.

FIGS. 15A to 15C are views illustrating a method of sharing content by capturing an electronic apparatus according to an embodiment.

Conventionally, a user may select an electronic apparatus for sharing the contents by using a list when the user selects an electronic apparatus for sharing the contents using the user terminal 200. However, when selecting an apparatus through the list, there is a drawback of difficulty in selecting an electronic apparatus for sharing the content, because the user has difficulty to recognize all the names and types of apparatuses. Thus, the user can select an electronic apparatus for sharing the content by capturing the electronic apparatus for sharing the content by the user terminal 200.

Specifically, the user terminal 200 may provide a list including a plurality of contents, as illustrated in FIG. 15A. At this time, the list may include various contents such as video contents, music contents, or the like.

If at least one of the plurality of contents included in the list is selected according and an icon for sharing the content is selected to the user input, the user terminal 200 may activate the camera and provide a screen including an image 1520 captured by the camera as shown in FIG. 15B.

As illustrated in FIG. 15C, when the user captures the electronic apparatus 100 for sharing the at least one selected content, the user terminal 200 may recognize the captured electronic apparatus 100 by comparing the captured electronic apparatus 100 with pre-stored appearance information of the electronic apparatus 100.

The user terminal 200 may establish communication with the recognized electronic apparatus 100 based on the pre-stored information on the electronic apparatus 100 and transmit the selected content to the electronic apparatus 100.

The user terminal 200 may establish a communication connection with the electronic apparatus 100 by capturing the screen output by the electronic apparatus 100 and receive state information of the current electronic apparatus 100 from the electronic apparatus 100, thus capable of providing a more improved user environment.

FIGS. 16A to 16D are views illustrating a method of providing by a user terminal a character input window by capturing an electronic apparatus in a state in which a character input is necessary, according to an embodiment.

Figure 16A:
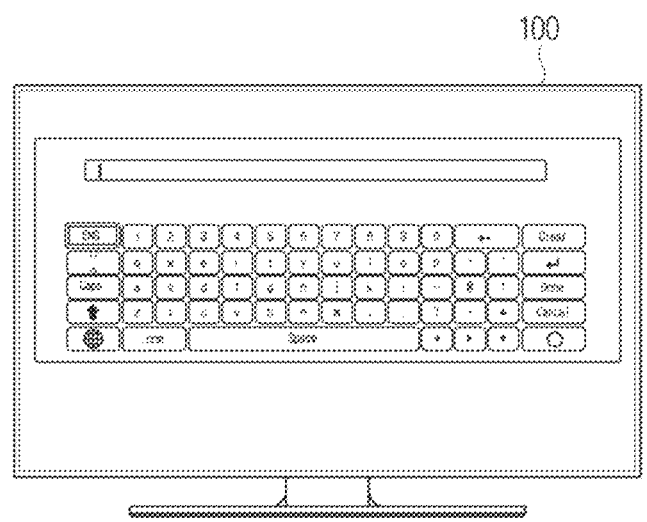
FIG. 16A is a view illustrating a method of providing by a user terminal a character input window by capturing an electronic apparatus in a state in which a character input is necessary, according to an embodiment.

The electronic apparatus 100 may display an input method editor (IME), as illustrated in FIG. 16A. That is, the electronic apparatus 100 can provide a user interface for receiving a character input from a user of the electronic apparatus 100. The interface may be inconvenient for character input compared to the user terminal 200 and thus, a character input operation may be provided through the user terminal 200. The electronic apparatus 100 may display a predefined marker with a character input.

Figure 16B:
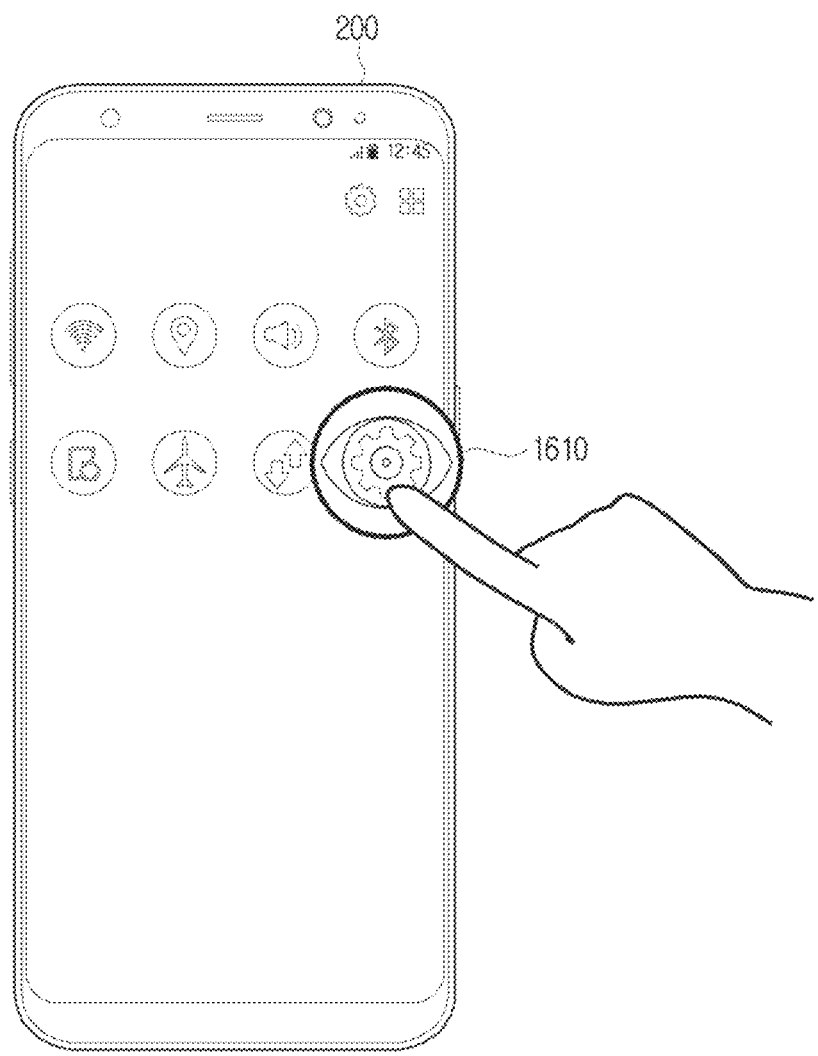
FIG. 16B is a view illustrating a method of providing by a user terminal a character input window by capturing an electronic apparatus in a state in which a character input is necessary, according to an embodiment.

As illustrated in FIG. 16B, the user terminal 200 may receive a user input for selecting an icon 1610 for executing an application to control the electronic apparatus 100 after establishing the communication connection with the electronic apparatus 100.

Figure 16C:
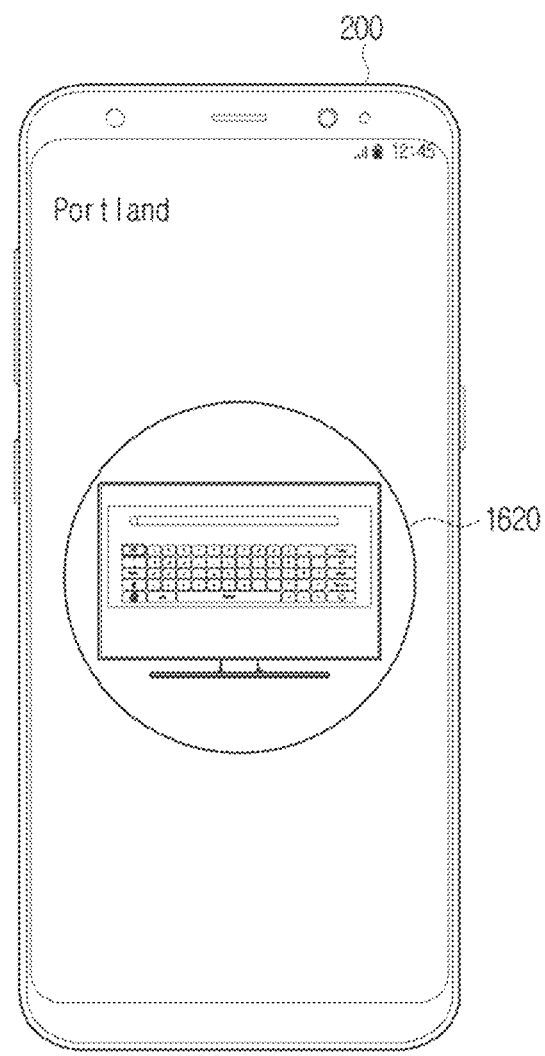
FIG. 16C is a view illustrating a method of providing by a user terminal a character input window by capturing an electronic apparatus in a state in which a character input is necessary, according to an embodiment.

When the icon 1610 is selected, the user terminal 200 may activate a camera and provide a screen including an image 1620 captured using the activated camera as illustrated in FIG. 16C.

If the pre-defined marker or the appearance of the electronic apparatus 100 is detected in the captured image 1620, the user terminal 200 may establish authentication of the electronic apparatus 100 based on the pre-defined marker or the appearance of the electronic apparatus 100, and transmit a signal confirming the authentication of the electronic apparatus 100 to the electronic apparatus 100. In response to the signal for confirming the authentication of the electronic apparatus 100, the user terminal 200 and the electronic apparatus 100 may establish a communication connection.

In one embodiment, when a communication connection is established, the electronic apparatus 100 may receive the state information of the user terminal 200. For example, the electronic apparatus 100 may transmit information about a currently executed application and information about a currently displayed screen to the user terminal 200. Thus, the user terminal 200 may identify that the electronic apparatus 100 is in a state in which the character input device is currently displayed.

In another embodiment, the user terminal 200 may analyze a screen of the electronic apparatus 100 included in the image 1620 to obtain status information of the current the electronic apparatus 100. That is, the user terminal 200 can confirm that the character input device is displayed on the current electronic apparatus 100 through image analysis.

Figure 16D:
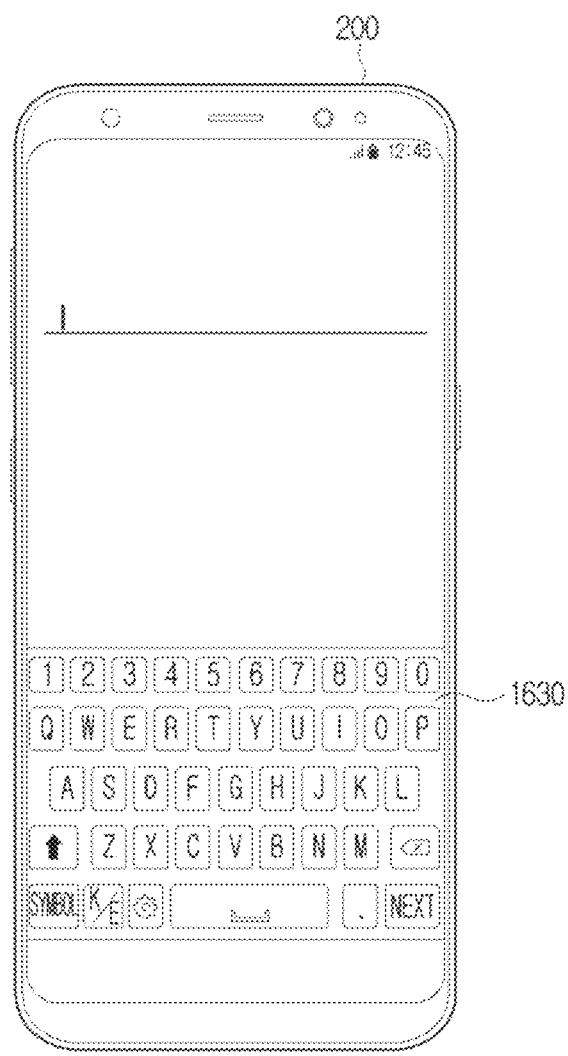
FIG. 16D is a view illustrating a method of providing by a user terminal a character input window by capturing an electronic apparatus in a state in which a character input is necessary, according to an embodiment.

If a state is identified that the character input device is displayed in the electronic apparatus 100 or a character input is required, the user terminal 200 may display a screen 1630 for inputting characters, as shown in FIG. 16D. When a user input is received on the screen 1630 for character input, the user terminal 200 can transmit information about the character corresponding to the user input to the electronic apparatus 100.

The electronic apparatus 100 may input a character to a character inputter based on information about a character received from the user terminal 200.

FIGS. 17A to 17F are views illustrating a method of logging into an application executed in an electronic apparatus by capturing an electronic apparatus, according to an embodiment.

Figure 17A:
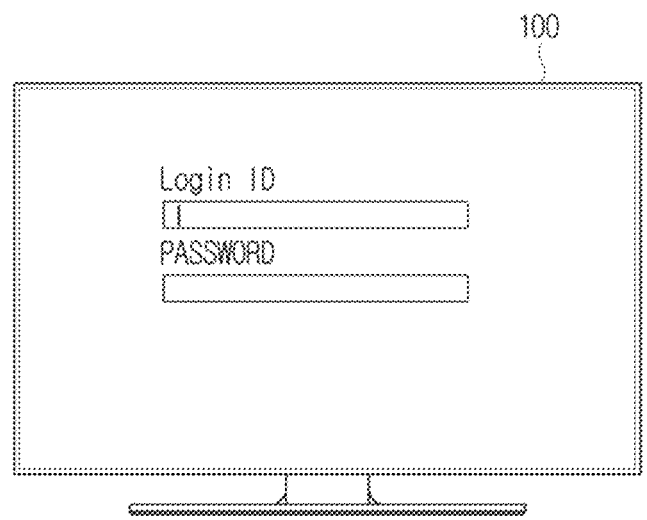
FIG. 17A is a view illustrating a method of logging into an application executed in an electronic apparatus by capturing an electronic apparatus, according to an embodiment.

The electronic apparatus 100 may display a login screen, as shown in FIG. 17A. That is, the electronic apparatus 100 may be in a state that login is currently necessary to be performed by the user to access the electronic apparatus 100. At this time, the electronic apparatus 100 may display a predefined marker within the login screen.

Figure 17B:
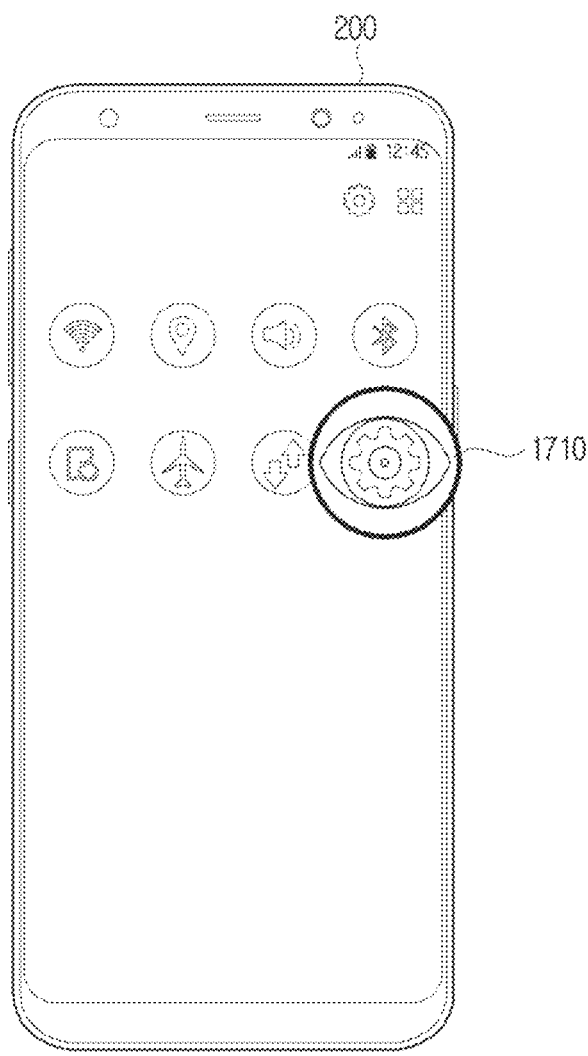
FIG. 17B is a view illustrating a method of logging into an application executed in an electronic apparatus by capturing an electronic apparatus, according to an embodiment.

As illustrated in FIG. 17B, the user terminal 200 may receive a user input for selecting an icon 1710 to execute an application to control the electronic apparatus 100 after the communication connection with the electronic apparatus 100.

Figure 17C:
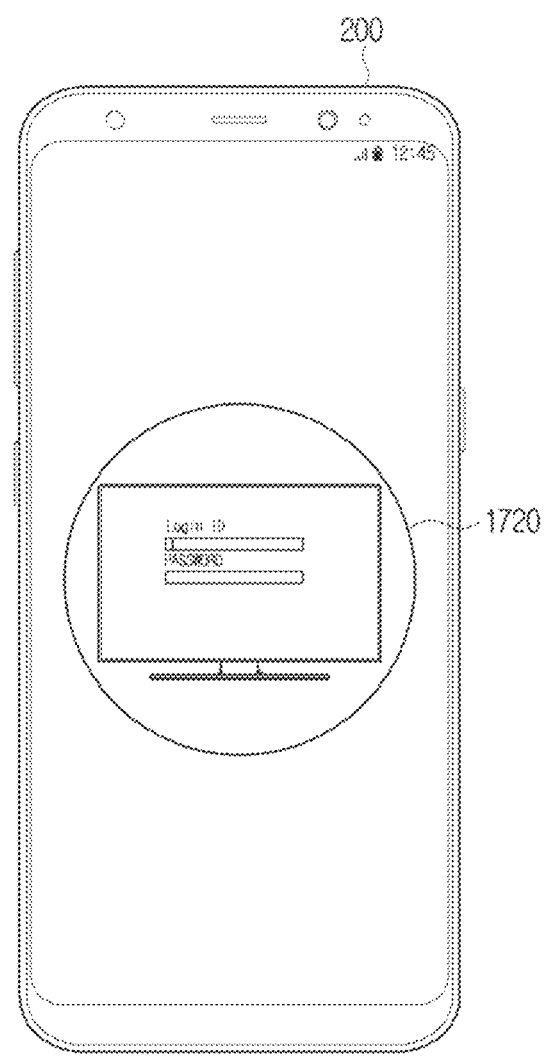
FIG. 17C is a view illustrating a method of logging into an application executed in an electronic apparatus by capturing an electronic apparatus, according to an embodiment.

When the icon 1710 is selected, the user terminal 200 may activate a camera and may provide a screen including an image 1720 captured by the activated camera as illustrated in FIG. 17C.

If the pre-defined marker or the appearance of the electronic apparatus 100 is detected in the captured image 1720, the user terminal 200 may perform authentication of the electronic apparatus 100 based on the pre-defined marker or the appearance of the electronic apparatus 100, and the user terminal 200 and the electronic apparatus 100 can establish a communication connection.

In one embodiment, when a communication connection is established, the electronic apparatus 100 may receive the status information of the electronic apparatus 100 to the user terminal 200. For example, the electronic apparatus 100 may transmit information on a currently executed application and a currently displayed screen to the user terminal 200.

Accordingly, the user terminal 200 may confirm that the electronic apparatus 100 is in a state in which the login screen is displayed.

In another embodiment, the user terminal 200 may analyze the screen of the electronic apparatus 100 included in the image 1720 and obtain status information of the current the electronic apparatus 100. That is, the user terminal 200 may confirm that the login screen is displayed on the current electronic apparatus 100 through image analysis.

Figure 17D:
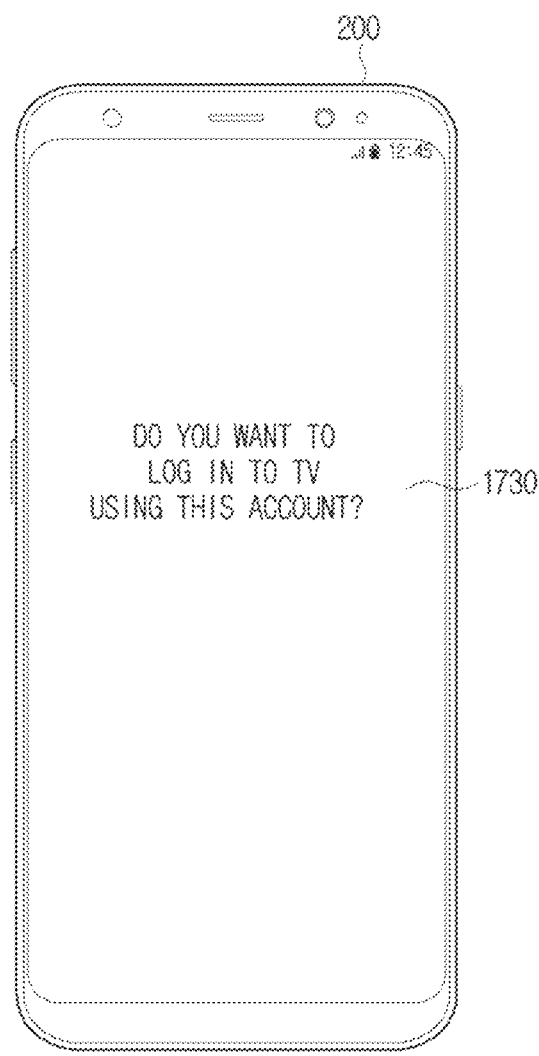
FIG. 17D is a view illustrating a method of logging into an application executed in an electronic apparatus by capturing an electronic apparatus, according to an embodiment.
Figure 17E:
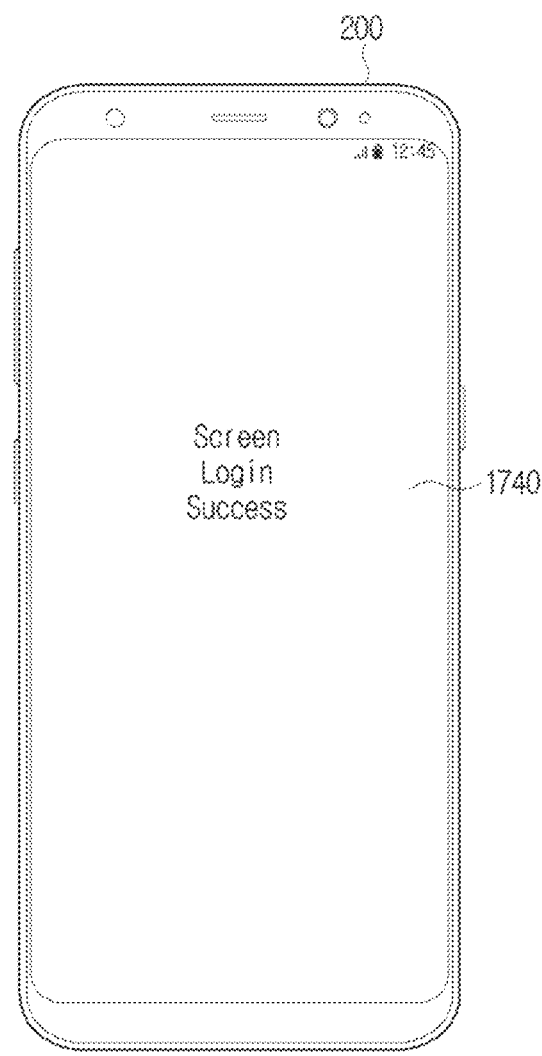
FIG. 17E is a view illustrating a method of logging into an application executed in an electronic apparatus by capturing an electronic apparatus, according to an embodiment.
Figure 17F:
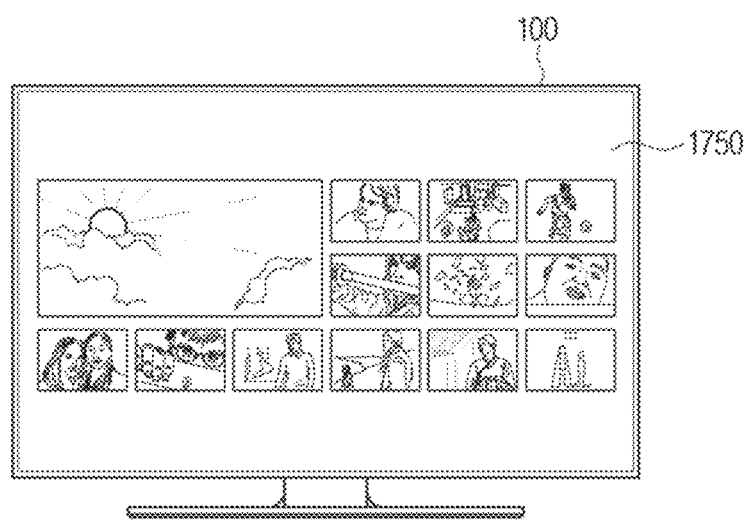
FIG. 17F is a view illustrating a method of logging into an application executed in an electronic apparatus by capturing an electronic apparatus, according to an embodiment.

If it is determined that the login screen is displayed on the current electronic apparatus 100, the user terminal 200 may display a screen 1730 for the login of the corresponding application, as illustrated in FIG. 17D. At this time, if the user terminal 200 receives information (e.g., ID/password, fingerprint, iris, and the like) from the user, the user terminal 200 may perform a login based on the received login information. If the login is successful, the user terminal 200 may display a screen 1740 guiding the login success as illustrated in FIG. 17E. The user terminal 200 may transmit the login information to the electronic apparatus 100, and the user terminal 200 may display an application execution screen 1750 as shown in FIG. 17F by logging in to the application.

That is, the user terminal 200 may capture the electronic apparatus 100 outputting a marker and establish a communication connection with the electronic apparatus 100, and may provide a variety of user experience and user environments for the communication-connected electronic apparatus 100.

The various embodiments may be implemented with software including one or more instructions stored in the storage medium (machine-readable storage media) readable by a machine (e.g., computer). The device is a device which is operable to call one instruction among instructions stored in the storage medium and execute the instructions, and may include an electronic apparatus (for example, electronic apparatus 100) according to the embodiments. When the instructions are executed by a processor, the processor may establish a function corresponding to the instructions directly or by using other components under the control of the processor. The instructions may include a code generated by a compiler or a code executable by an interpreter. A machine-readable storage medium may be provided in the form of a non-transitory storage medium. Herein, the term "non-transitory" only denotes that a storage medium does not include a signal but is tangible, and does not distinguish the configuration in which a data is semi-permanently stored in a storage medium from the configuration in which a data is temporarily stored in a storage medium.

According to an embodiment, the method according to various embodiments disclosed herein may be provided in a computer program product. A computer program product may be exchanged between a seller and a purchaser as a commodity. A computer program product may be distributed in the form of a machine-readable storage medium (e.g., compact disc read only memory (CD-ROM)) or distributed online through an application store (e.g. PlayStore™) directly between two user devices. In the configuration of on-line distribution, at least a portion of the computer program product may be stored temporarily or at least temporarily in a storage medium such as a manufacturer's server, a server of an application store, or a memory of a relay server.

Each of the elements (for example, a module or a program) according to various embodiments may be composed of a single entity or a plurality of entities, and some sub-elements of the abovementioned sub-elements may be omitted. The elements may be further included in various embodiments. Alternatively or additionally, some elements (e.g., modules or programs) may be integrated into one entity to perform the same or similar functions performed by each respective element prior to integration. Operations performed by a module, program, or other element, in accordance with various embodiments, may be performed sequentially, in a parallel, repetitive, or heuristically manner, or at least some operations may be performed in a different order, or other operations may be added.

What is claimed is:

1. An electronic apparatus comprising:
a display;
a communication interface;
a light outputter;
a memory comprising at least one instruction; and
one or more processors configured to execute the at least one instruction, wherein the one or more processors, by executing the at least one instruction, is configured to:
based on an external user terminal being discovered by the electronic apparatus through the communication interface, control the display to display a first marker and control the light outputter to output light of a predefined pattern as a second marker, each of the first marker and the second marker being a marker for guiding an operation of a user to establish a communication connection between the electronic apparatus and the external user terminal,
receive information on the external user terminal through the communication interface,
based on the external user terminal authenticating the electronic apparatus by capturing an image of the electronic apparatus displaying the first marker and receiving the light of the predefined pattern as the second marker, receive a signal confirming authentication of the electronic apparatus from the external user terminal through the communication interface,
establish the communication connection with the external user terminal through the communication interface in response to receiving the signal, and
based on the communication connection with the external user terminal being established, remove the first marker and control the display to display the information on the external user terminal.

2. The electronic apparatus of claim 1, wherein the one or more processors by executing the at least one instruction is configured to control the display to display a background screen of a predefined pattern or a color along with the first marker.

3. A user terminal comprising:
a camera;
a display;
a communication interface;
a memory comprising at least one instruction; and
one or more processors configured to execute the at least one instruction, wherein the one or more processors, by executing the at least one instruction, is configured to:
based on an electronic apparatus being discovered by the user terminal through the communication interface, control the display to display a menu for establishing a communication connection with the electronic apparatus,
based on receiving a user input for establishing the communication connection with the electronic apparatus through the menu, activate the camera and control the display to display a screen comprising an image captured by the camera, the captured image including an appearance of the electronic apparatus and a marker for guiding an operation of a user to establish the communication connection with the user terminal, the appearance of the electronic apparatus including an outer shape of the electronic apparatus, and
based on the appearance of the electronic apparatus and the marker included in the captured image, authenticate the electronic apparatus, and
based on the electronic apparatus being authenticated establish the communication connection with the electronic apparatus by transmitting a signal confirming authentication of the electronic apparatus through the communication interface,
wherein the screen comprises a user interface (UI) for guiding a position of the electronic apparatus that outputs the marker.

4. The user terminal of claim 3, wherein the one or more processors by executing the at least one instruction is configured to analyze the appearance of the electronic apparatus and at least one of a text or an image included in the marker, and
authenticate the electronic apparatus based on the appearance of the electronic apparatus and the at least one of the text or the image included in the marker corresponding to at least one of a pre-stored text or a pre-stored image.

5. The user terminal of claim 3, wherein the one or more processors by executing the at least one instruction is configured to authenticate the electronic apparatus by analyzing the appearance of the electronic apparatus included in the captured image along with a text and an image included in the marker and a background screen displayed by the electronic apparatus.

6. The user terminal of claim 3, wherein the one or more processors by executing the at least one instruction is configured to receive information on the electronic apparatus through the communication interface while discovering the electronic apparatus,
wherein the screen comprises information on the electronic apparatus along with the image.

7. The user terminal of claim 3, wherein the one or more processors by executing the at least one instruction is configured to, based on the communication connection with the electronic apparatus being established, remove the image and control the display to display a message indicating that the communication connection with the electronic apparatus is established.

8. A method of controlling an electronic apparatus, the method comprising:
based on an external user terminal being discovered by the electronic apparatus, displaying a first marker and outputting light of a predefined pattern as a second marker, each of the first marker and the second marker being a marker for guiding an operation of a user to establish a communication connection with the external user terminal;
receiving information of the external user terminal,
based on the external user terminal authenticating the electronic apparatus by capturing an image of the electronic apparatus displaying the first marker and receiving the light of the predefined pattern as the second marker, receiving a signal confirming authentication of the electronic apparatus from the external user terminal;
establishing the communication connection with the external user terminal in response to receiving the signal, and
based on the communication connection with the external user terminal being established, removing the first marker and displaying information on the external user terminal.

9. The method of claim 8, wherein the displaying the first marker comprises displaying a background screen of a predefined pattern or a color along with the first marker.

10. A method of controlling a user terminal, the method comprising:

based on an electronic apparatus being discovered by the user terminal, displaying a menu for establishing a communication connection with the electronic apparatus;

based on receiving a user input for establishing the communication connection with the electronic apparatus through the menu, activating a camera of the user terminal and displaying a screen comprising an image captured by the camera, the captured image including an appearance of the electronic apparatus and a marker for guiding an operation of a user to establish the communication connection with the user terminal, the appearance of the electronic apparatus including an outer shape of the electronic apparatus;

based on the appearance of the electronic apparatus and the marker included in the captured image, authenticating the electronic apparatus; and based on the electronic apparatus being authenticated, establishing the communication connection with the electronic apparatus by transmitting a signal confirming authentication of the electronic apparatus wherein the screen comprises a user interface (UI) for guiding a position of the electronic apparatus that outputs the marker.

11. The method of claim 10, wherein the authenticating comprises:

analyzing the appearance of the electronic apparatus and at least one of a text or an image included in the marker and authenticating the electronic apparatus based on the appearance of the electronic apparatus and the at least one of the text and the image corresponding to at least one of a pre-stored text or a pre-stored image.

12. The method of claim 10, wherein the authenticating comprises authenticating the electronic apparatus by analyzing the appearance of the electronic apparatus included in the captured image along with a text and an image included in the marker and a background screen displayed by the electronic apparatus.

13. The method of claim 10, further comprising:

receiving information on the electronic apparatus while discovering the electronic apparatus, wherein the screen comprises information on the electronic apparatus along with the image.

14. The method of claim 10, further comprising:

based on the communication connection with the electronic apparatus being established, removing the image and displaying a message indicating that the communication connection with the electronic apparatus is established.

\* \* \* \* \*